United States Patent
Suwa et al.

(10) Patent No.: US 8,320,382 B2
(45) Date of Patent: Nov. 27, 2012

(54) MOBILE COMMUNICATION SYSTEM, A MOBILE STATION, A BASE STATION AND COMMUNICATION CONTROL METHOD

(75) Inventors: Shingo Suwa, Yokosuka (JP); Motohiro Tanno, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 782 days.

(21) Appl. No.: 11/911,511

(22) PCT Filed: Apr. 10, 2006

(86) PCT No.: PCT/JP2006/307570
§ 371 (c)(1),
(2), (4) Date: Dec. 22, 2008

(87) PCT Pub. No.: WO2006/112292
PCT Pub. Date: Oct. 26, 2006

(65) Prior Publication Data
US 2009/0129322 A1 May 21, 2009

(30) Foreign Application Priority Data

Apr. 13, 2005 (JP) ................. 2005-116107
Jun. 14, 2005 (JP) ................. 2005-174392

(51) Int. Cl.
*H04L 12/28* (2006.01)
*H04L 12/26* (2006.01)
*H04W 4/00* (2009.01)

(52) U.S. Cl. ............... 370/395.21; 370/252; 370/328; 370/338

(58) Field of Classification Search ............ 370/252, 370/395.21, 310–350
See application file for complete search history.

(56) References Cited

U.S. PATENT DOCUMENTS

| 6,031,827 | A  | * | 2/2000 | Rikkinen et al. | ............. 370/330 |
| 7,027,523 | B2 | * | 4/2006 | Jalali et al. | ............. 375/296 |
| 7,050,759 | B2 | * | 5/2006 | Gaal et al. | ............. 455/67.13 |

(Continued)

FOREIGN PATENT DOCUMENTS

JP  7-95151 A  4/1995

(Continued)

OTHER PUBLICATIONS

Atsushi Harada, et al., "Adaptive Radio Parameter Control Considering QoS for Forward Link OFCDM Wireless Access," IEICE Trans. Commun., vol. E86-B, No. 1, pp. 314-324, Jan. 2003, 11 pages.

(Continued)

*Primary Examiner* — Warner Wong
(74) *Attorney, Agent, or Firm* — Osha Liang LLP

(57) ABSTRACT

A mobile station includes: a QoS (quality of service) requirement determination unit configured to determine a QoS requirement for a data packet; a downlink channel condition estimation unit configured to estimate a downlink channel condition; an identification number extracting unit configured to extract an identification number for the mobile station; and a notification unit configured to notify a base station of the QoS requirement, the identification number for the mobile station, and the downlink channel condition by means of a reservation packet. A base station includes: an uplink channel condition estimation unit configured to estimate an uplink channel condition by means of a reservation packet; a radio parameter control unit configured to determine and control a radio parameter based on the reservation packet and the uplink channel condition.

20 Claims, 24 Drawing Sheets

U.S. PATENT DOCUMENTS

| | | | | |
|---|---|---|---|---|
| 7,525,926 | B2* | 4/2009 | Cho et al. | 370/252 |
| 2004/0081115 | A1* | 4/2004 | Parsa et al. | 370/320 |
| 2004/0109455 | A1* | 6/2004 | Jouppi et al. | 370/395.52 |
| 2005/0052991 | A1* | 3/2005 | Kadous | 370/216 |
| 2005/0181799 | A1* | 8/2005 | Laroia et al. | 455/450 |
| 2006/0256749 | A1* | 11/2006 | Rexhepi et al. | 370/329 |
| 2006/0256761 | A1* | 11/2006 | Meylan et al. | 370/338 |
| 2007/0242654 | A1* | 10/2007 | Kawabata et al. | 370/348 |
| 2008/0037450 | A1* | 2/2008 | Itoh et al. | 370/278 |
| 2010/0034185 | A1* | 2/2010 | De Bruin et al. | 370/342 |

FOREIGN PATENT DOCUMENTS

| | | |
|---|---|---|
| JP | 9-55693 A | 2/1997 |
| JP | 09-083600 | 3/1997 |
| JP | 2001-502866 | 2/2001 |
| JP | 2004-297621 A | 10/2004 |
| JP | 2005-229272 A | 8/2005 |

OTHER PUBLICATIONS

3GPP RAN, 3G TS25.211 V3.4.0, Sep. 2000, 43 pages.

Yousuke Iizuka, et al., "Efficient Random Access Channel Transmission Method Using Packet Retransmission According to QoS," IEICE Trans. Fundamentals, vol. E86-A, No. 7, pp. 1669-1675, Jul. 2003, 7 pages.

International Search Report w/ English translation mailed Jun. 20, 2006 (5 pages).

3GPP TS 25.212 V3.5.0 (Dec. 2000) 3rd Generation Partership Project; Technical Specification Group Radio Access Network; Multiplexing and Channel Coding (FDD) (Release 1999).

Japanese Office Action for Application No. 2005-174392, mailed on Dec. 14, 2010 (3 pages).

Patent Abstracts of Japan for Japanese Publication No. 2004-297621, publication date Oct. 21, 2004 (1 page).

* cited by examiner

UNIT OF SECTOR

UNIT OF BS (CELL)

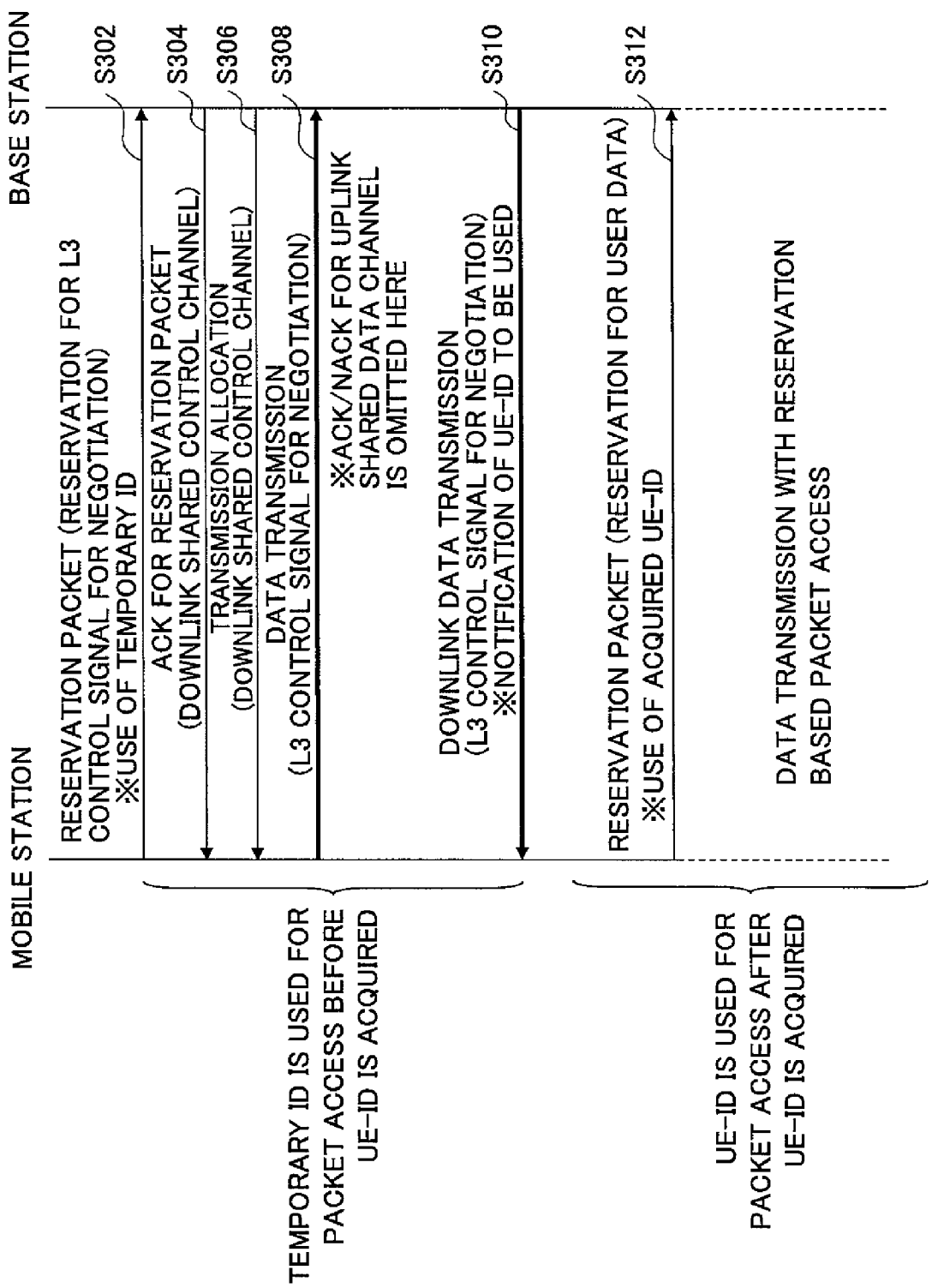

FIG.9A (1) EXAMPLE OF PREDETERMINED CORRESPONDENCE IN SYSTEM

| QUEUE-ID | QoS CLASS | |
|---|---|---|
| | ACCEPTABLE DELAY | ACCEPTABLE RESIDUAL ERROR RATE |
| #1 | X1 | y1 |
| #2 | X2 | y2 |
| #3 | X3 | y3 |
| ⋮ | ⋮ | ⋮ |
| #n | Xn | yn |

FIG.9B (2) EXAMPLE OF CORRESPONDENCE AFTER NEGOTIATION BETWEEN UE AND NETWORK AT CONNECTION

| QUEUE-ID | QoS CLASS | |
|---|---|---|
| | ACCEPTABLE DELAY | ACCEPTABLE RESIDUAL ERROR RATE |
| #1 | X1 | y1 |
| #2 | X2 | y2 |

TIME-MULTIPLEXING SCHEME

CODE-MULTIPLEXING SCHEME

FREQUENCY-MULTIPLEXING SCHEME

| UE-ID | Q-ID | DATA SIZE | TRANSMISSION POWER | (CRC) |
|---|---|---|---|---|

FIG.12B

| Q-ID | DATA SIZE | TRANSMISSION POWER | (CRC) |
|------|-----------|--------------------|---------|

※IN THE CASE WHERE UE CAN BE IDENTIFIED BASED ON CONTROL CHANNEL RATHER THAN COMMON CHANNEL

FIG.12C

| Q-ID | DATA SIZE | TRANSMISSION POWER | UE-specific CRC |
|------|-----------|--------------------|-----------------|

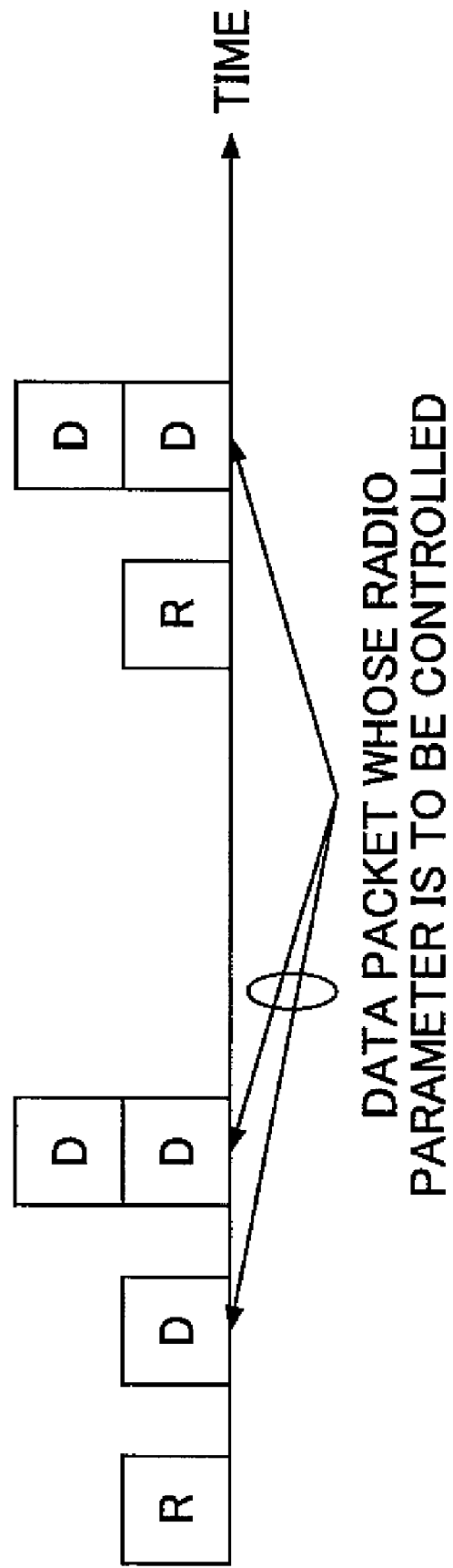

DATA PACKET WHOSE RADIO
PARAMETER IS TO BE CONTROLLED

DATA PACKET WHOSE RADIO
PARAMETER IS TO BE CONTROLLED

DATA PACKET WHOSE RADIO
PARAMETER IS TO BE CONTROLLED

DATA PACKET WHOSE RADIO
PARAMETER IS TO BE CONTROLLED

R: RESERVATION PACKET
D: DATA PACKET
P: PILOT CHANNEL

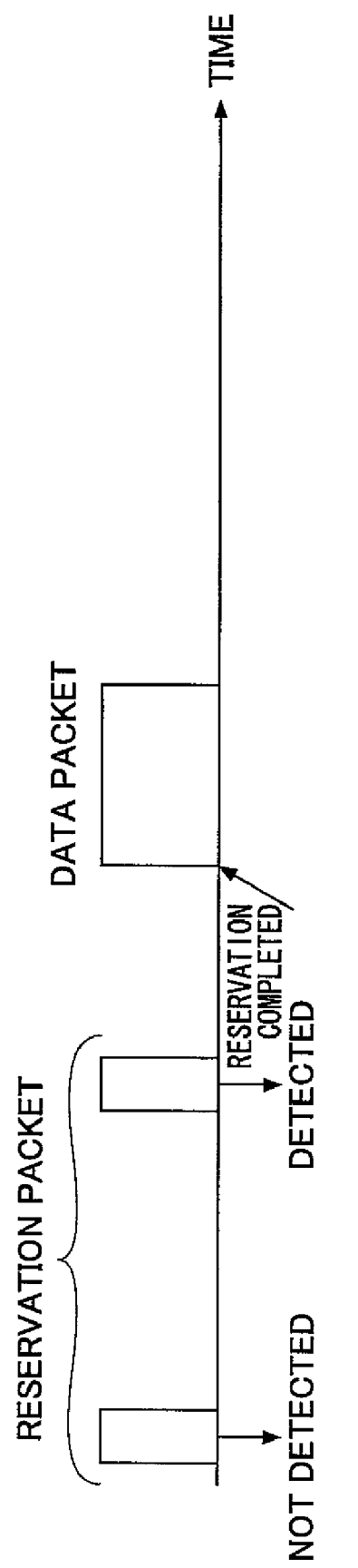

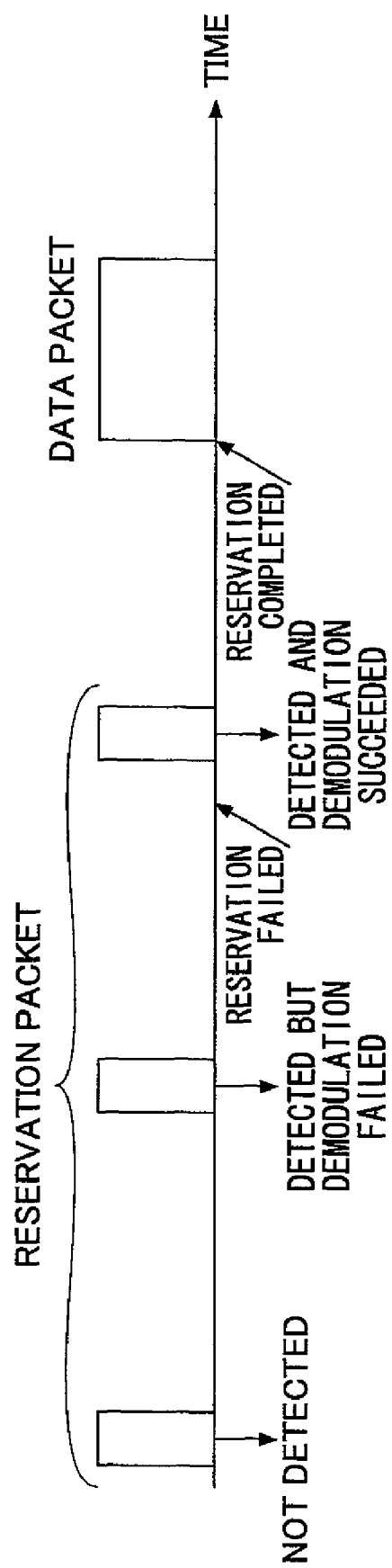

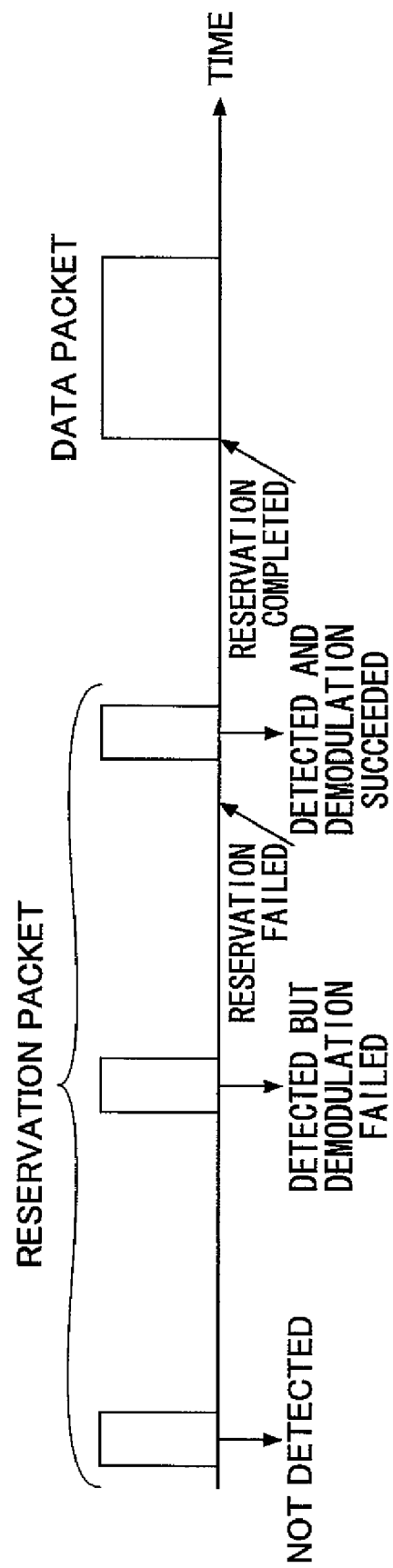

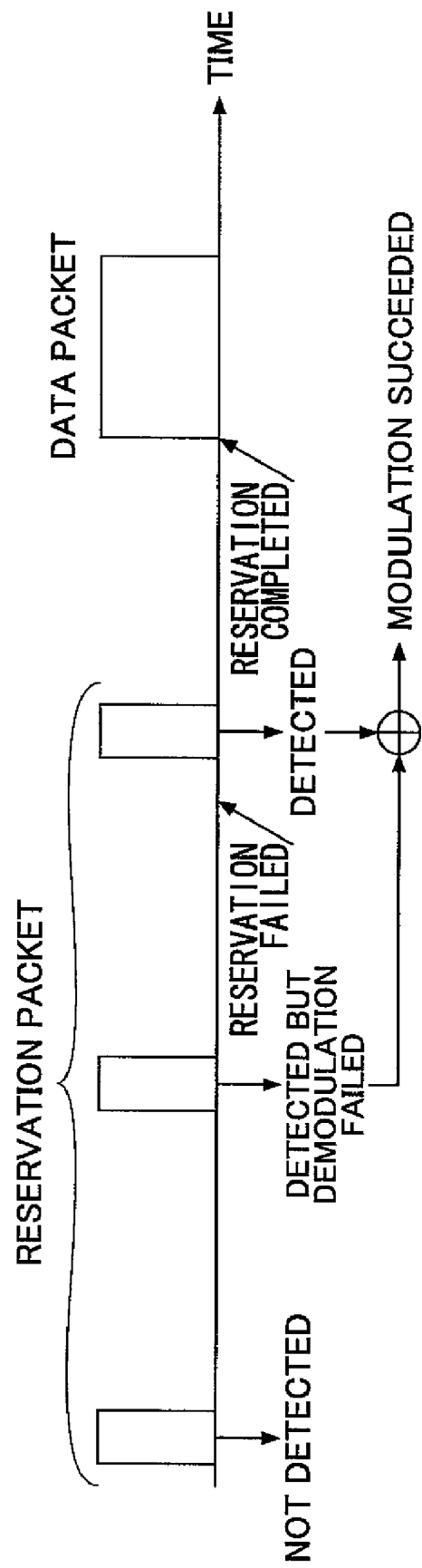

FIG.18A
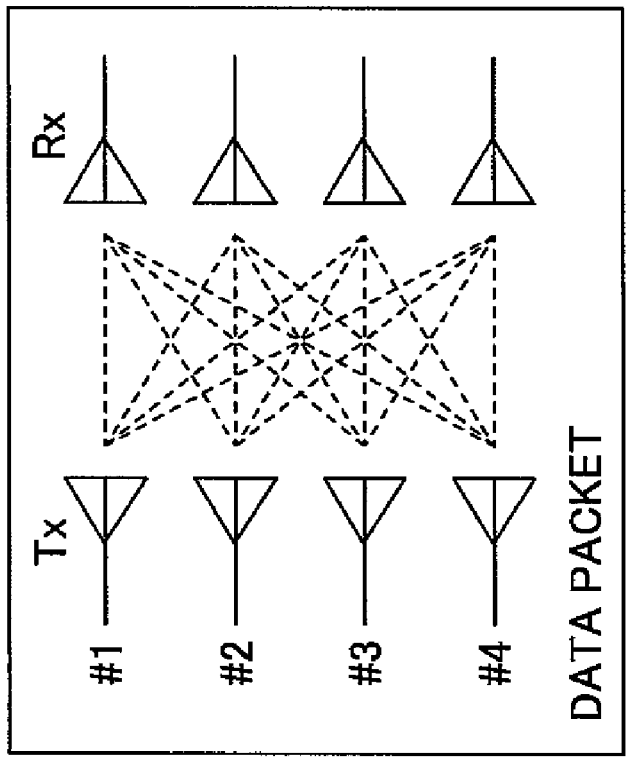
DATA PACKET
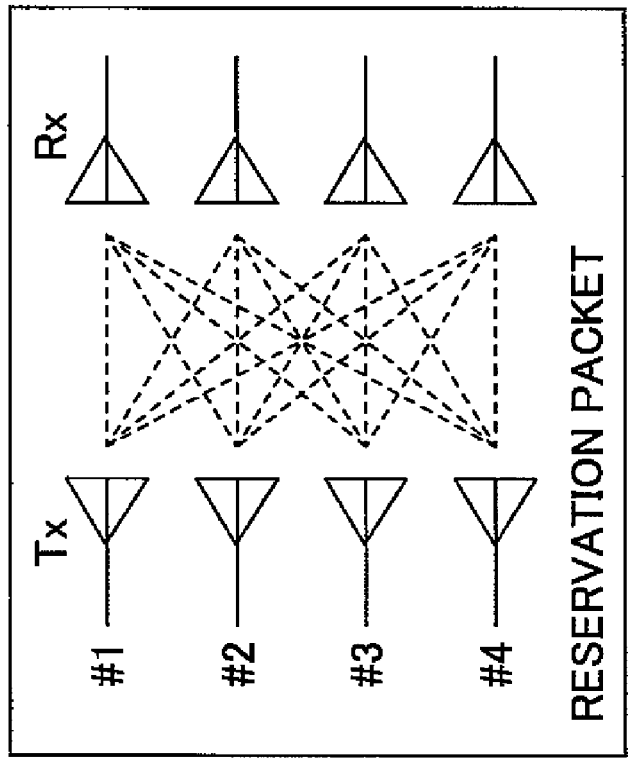
RESERVATION PACKET

FIG.18B
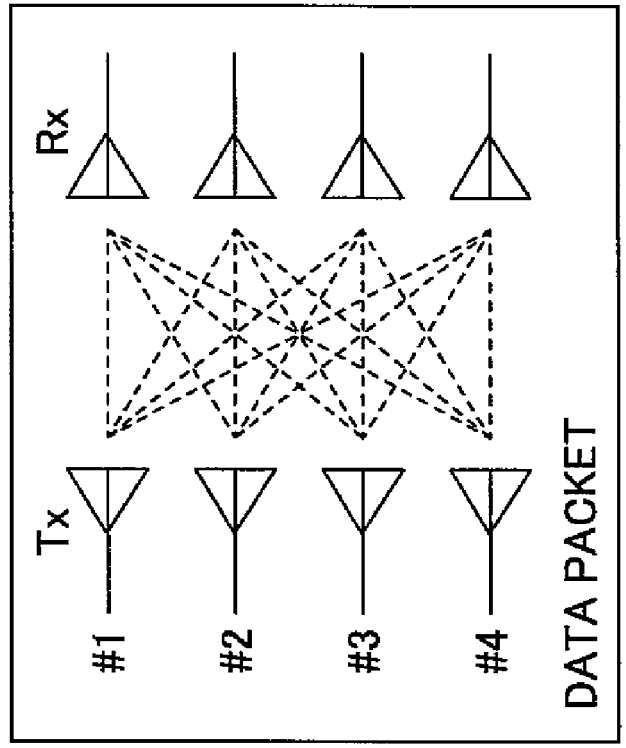
DATA PACKET
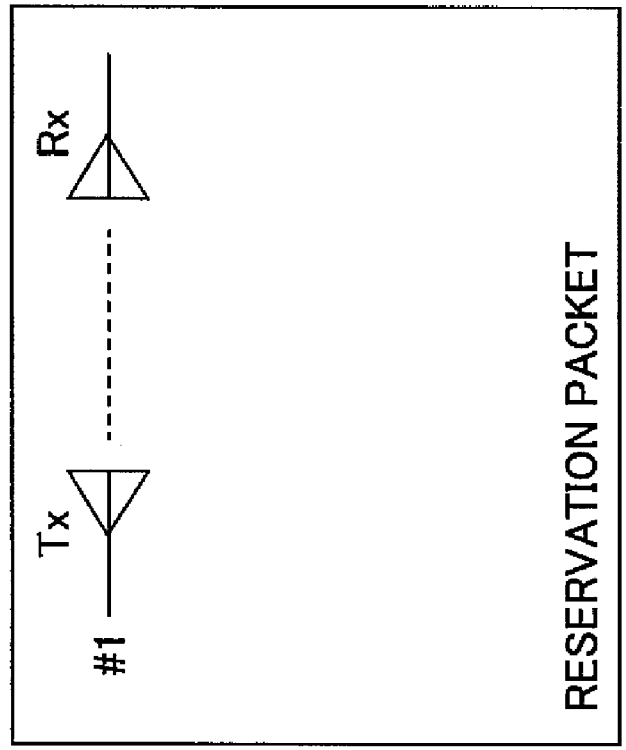
RESERVATION PACKET

MOBILE COMMUNICATION SYSTEM, A MOBILE STATION, A BASE STATION AND COMMUNICATION CONTROL METHOD

BACKGROUND OF THE INVENTION

1. Field of the Invention

The present invention relates to a mobile communication system, a mobile station, a base station and a communication control method where reservation based packet access for controlling radio parameters for a data packet by means of a reservation packet is employed in a multi-path fading environment.

2. Description of the Related Art

In the 3rd generation mobile communication systems, there is a significant increase in demand for data services using a wideband radio network. In order to satisfy this demand and to offer services with a lower cost and a faster information rate, high-speed access (broadband access) is increasingly needed.

In the case of uplink transmission, as for NRT (Non-Real Time) traffic such as downloading of large-volume data, demand for high-speed and high-capacity transmission can be considered to be lower than demand in the case of downlink transmission. However, as for RT (Real Time) traffic data with strict requirements for delay or as for interactive data services where uplink capacity and downlink capacity are symmetrical, it is necessary to increase link capacity for uplink transmission at the same level as that for downlink transmission.

Accordingly, as for data services where uplink capacity and downlink capacity are symmetrical, radio access is needed which achieves high quality reception in multi-path fading channels, low power consumption in a mobile station, flexible utilization of time/frequency/code resources, and so on.

In the aforementioned broadband packet radio access, on the other hand, it is expected that there will be a variety of requirements for QoS (Quality of Service) defined by a transmission speed, a transmission delay, an acceptable residual PER (Packet Error Rate), and so on.

As for RT traffic such as voice communications, video communications, and interactive services, for example, it is necessary to reduce an end-to-end transmission delay, because an increase in the transmission delay and delay jitter causes significant degradation in quality. In addition, as for NRT (Non-Real Time) traffic such as file transfer and WWW browsing, although requirements for the transmission delay are loose, high throughput and reliable transmission (error-free transmission in principle) is needed. Thus, technologies for controlling QoS are expected to be important in order to efficiently offer multimedia services with various requirements for QoS (for example, Non-Patent Reference 1).

In W-CDMA systems, random access based on slotted ALOHA is used for uplink transmission (for example, Non-Patent Reference 2). In this situation, either call requests and/or reservation control packets prior to a dedicated channel or discrete short packets are transmitted from a mobile station on RACH (Random Access Channel). In next-generation broadband packet radio access, it is expected that whole radio segments will be in the form of packet-based access.

It is also expected that there will be an increase in demand for burst Internet access. Thus, random (reservation based) access will be also expected to be more important, and efficient reservation based access in accordance with various QoS requirements is needed. Under this circumstance, reservation based access is proposed which controls a transmission power offset for a message data portion relative to a reservation packet portion in accordance with a QoS requirement (an acceptable delay) for traffic data to be transmitted by means of a reservation packet. Compared to the conventional method without packet retransmission-combining, the proposed reservation based access can reduce average received $E_b/N_0$ (signal energy per bit-to-background noise power spectrum density ratio) which satisfies required quality, particularly for NRT traffic data where requirements for an acceptable delay are relatively loose, by reducing transmission power offset for each packet and utilizing a time diversity effect by means of packet retransmission-combining (for example, Non-Patent Reference 3).

[Non-Patent Reference 1] A. Harada, S. Abeta, and M. Sawahashi, "Adaptive radio parameter control considering QoS for forward link OFCDM wireless access", IEICE Trans. Commun., vol. E86-B, no. 1, pp. 314-324, January 2003.

[Non-Patent Reference 2] 3GPP RAN, 3G TS 25.211 V3.4.0, September 2002.

[Non-Patent Reference 3] Y. Tizuka, M. Tanno, and M. Sawahashi, "Efficient random access channel transmission method using packet retransmission according to QoS", IEICE Trans. Fundamentals, vol. E86-A, no. 7, pp. 1669-1675, July 2003.

SUMMARY OF THE INVENTION

Problem(s) to be Solved by the Invention

However, the above-mentioned background technologies present the following problems.

As for RT traffic, requirements for an acceptable delay are strict and a time diversity effect is smaller than NRT traffic, and also the SIR for a data packet which satisfies required quality varies depending on a radio channel condition such as the number of paths. For these reasons, when transmission power does not change depending on the number of paths, for example, the transmission power needs to be adjusted based on the case where the number of paths is small, in order to satisfy requirements for QoS under the circumstances with various numbers of paths. However, it presents a problem that transmission power which satisfies the required quality may increase compared to the approach for controlling transmission power in consideration of the number of paths.

Consequently, it is a general object of the present invention to provide a mobile communication system, a mobile station, a base station and a communication control method which can reduce transmission power while satisfying QoS requirements.

Means for Solving the Problem

In one aspect of the present invention, a mobile station performing packet communications with a base station in a mobile communication system includes:

a QoS (quality of service) requirement determination unit configured to determine a QoS requirement for a data packet;

a downlink channel condition estimation unit configured to estimate a downlink channel condition;

an identification number extracting unit configured to extract an identification number for the mobile station; and a notification unit configured to notify the base station of the QoS requirement, the identification number for the mobile station, and the downlink channel condition by means of a reservation packet.

The notification unit may map at least one of
the identification number for the mobile station;
the QoS requirement;
the downlink channel condition;
a data size of transmission data; and
transmission power;
to a control channel in the reservation packet for transmission.

The notification unit may transmit information about a service requirement class corresponding to multiple QoS requirements.

The mobile station may further include:
a transmission buffer configured to associate data with the service requirement class to store the data, and
the notification unit may transmit an identifier for the service requirement class based on the service requirement class associated with transmission data.

The notification unit may notify the base station of the data size based on at least one of a certain fundamental unit and a predetermined threshold.

The notification unit may transmit the reservation packet based on generated traffic.

The notification unit may retransmit the reservation packet based on a result of detecting and/or demodulating the reservation packet at the base station.

The identification number extracting unit may request the identification number using a temporary ID provided for each predetermined domain.

The identification number extracting unit may acquire the identification number in the case where the mobile station is turned on, where connection with the base station is established, or where the mobile station starts communicating.

The mobile station may further include:
multiple antennas configured to transmit the reserved packet, and
the notification unit may notify the base station of information about an antenna used for transmission among the multiple antennas before transmitting the reservation packet.

In one aspect of the present invention, a base station performing packet communications with a mobile station in a mobile communication system includes:
an uplink channel condition estimation unit configured to estimate an uplink channel condition by means of a reservation packet;
a radio parameter control unit configured to determine and control a radio parameter based on the reservation packet and the uplink channel condition; and
a broadcast unit configured to broadcast the determined radio parameter.

The base station may further include:
a demodulation unit configured to combine the reservation packet with another reservation packet received after the reservation packet based on a result of demodulating the received reservation packet to perform demodulation.

The uplink channel condition estimation unit may estimate the uplink channel condition based on information about an antenna received from the mobile station.

The base station may further include:
a control channel generating unit configured to notify the mobile station of an identification number in response to a request for the identification number received from the mobile station.

The control channel generating unit may manage the identification number based on at least one of a sector domain and a base station domain.

In one aspect of the present invention, there is provided a mobile communication system where packet communications are performed between a base station and a mobile station, wherein:
the mobile station includes
a QoS (quality of service) requirement determination unit configured to determine a QoS requirement for a data packet;
a downlink channel condition estimation unit configured to estimate a downlink channel condition;
an identification number extracting unit configured to extract an identification number for the mobile station; and
a notification unit configured to notify the base station of the QoS requirement, the identification number for the mobile station, and the downlink channel condition by means of a reservation packet; and
the base station includes
an uplink channel condition estimation unit configured to estimate an uplink channel condition by means of the reservation packet;
a radio parameter control unit configured to control a radio parameter based on the reservation packet and the uplink channel condition.

In one aspect of the present invention, a communication control method in a mobile communication system where packet communications are performed between a base station and a mobile station includes the steps of:
at the mobile station,
determining a QoS (quality of service) requirement for a data packet;
estimating a downlink channel condition;
extracting an identification number for the mobile station; and
notifying the base station of the QoS requirement, the identification number for the mobile station, and the downlink channel condition by means of a reservation packet;
at the base station,
estimating an uplink channel condition by means of the reservation packet;
determining and controlling a radio parameter based on the reservation packet and the uplink channel condition; and
broadcasting the determined radio parameter.

The step of notifying may include the step of:
mapping at least one of
the identification number for the mobile station;
the QoS requirement;
the downlink channel condition;
a data size of transmission data; and
transmission power;
to a control channel in the reservation packet for transmission.

The communication control method may further include the steps of:
at the mobile station,
requesting the identification number using a temporary ID provided for each domain in which the identification number is managed; and
at the base station,
notifying the mobile station of the identification number in response to the request for the identification number received from the mobile station.

Effect of the Invention

According to an embodiment of the present invention, a mobile communication system, a mobile station, a base sta-

BRIEF DESCRIPTION OF THE DRAWINGS

FIG. 3 shows a sequence diagram for illustrating a method of acquiring a UE-ID used for a reservation packet.

FIG. 9A shows a diagram illustrating usage of a Queue-ID.

FIG. 9B shows a diagram illustrating usage of a Queue-ID.

FIG. 12B shows a structure of a reservation packet in a mobile station in accordance with an embodiment of the present invention.

FIG. 12C shows a structure of a reservation packet in a mobile station in accordance with an embodiment of the present invention.

FIG. 13B shows a diagram for illustrating a method of transmitting a reservation packet in a mobile station in accordance with an embodiment of the present invention.

FIG. 16A shows a diagram for illustrating a method of controlling retransmission of a reservation packet based on a result of detecting the reservation packet in a mobile station in accordance with an embodiment of the present invention.

FIG. 16B shows a diagram for illustrating a method of controlling retransmission of a reservation packet based on a result of demodulating the reservation packet in a mobile station in accordance with an embodiment of the present invention.

FIG. 17A shows a diagram for illustrating a method without retransmission-combining of reservation packets in a mobile station in accordance with an embodiment of the present invention.

FIG. 17B shows a diagram for illustrating a method of performing retransmission-combining of reservation packets in a mobile station in accordance with an embodiment of the present invention.

FIG. 18A shows a diagram for illustrating a method of transmitting a reservation packet by means of 4 antennas in a MIMO based mobile communication system in accordance with an embodiment of the present invention.

FIG. 18B shows a diagram for illustrating a method of transmitting a reservation packet by means of a single antenna in a MIMO based mobile communication system in accordance with an embodiment of the present invention.

DESCRIPTION OF THE PREFERRED EMBODIMENTS

Figure 1:
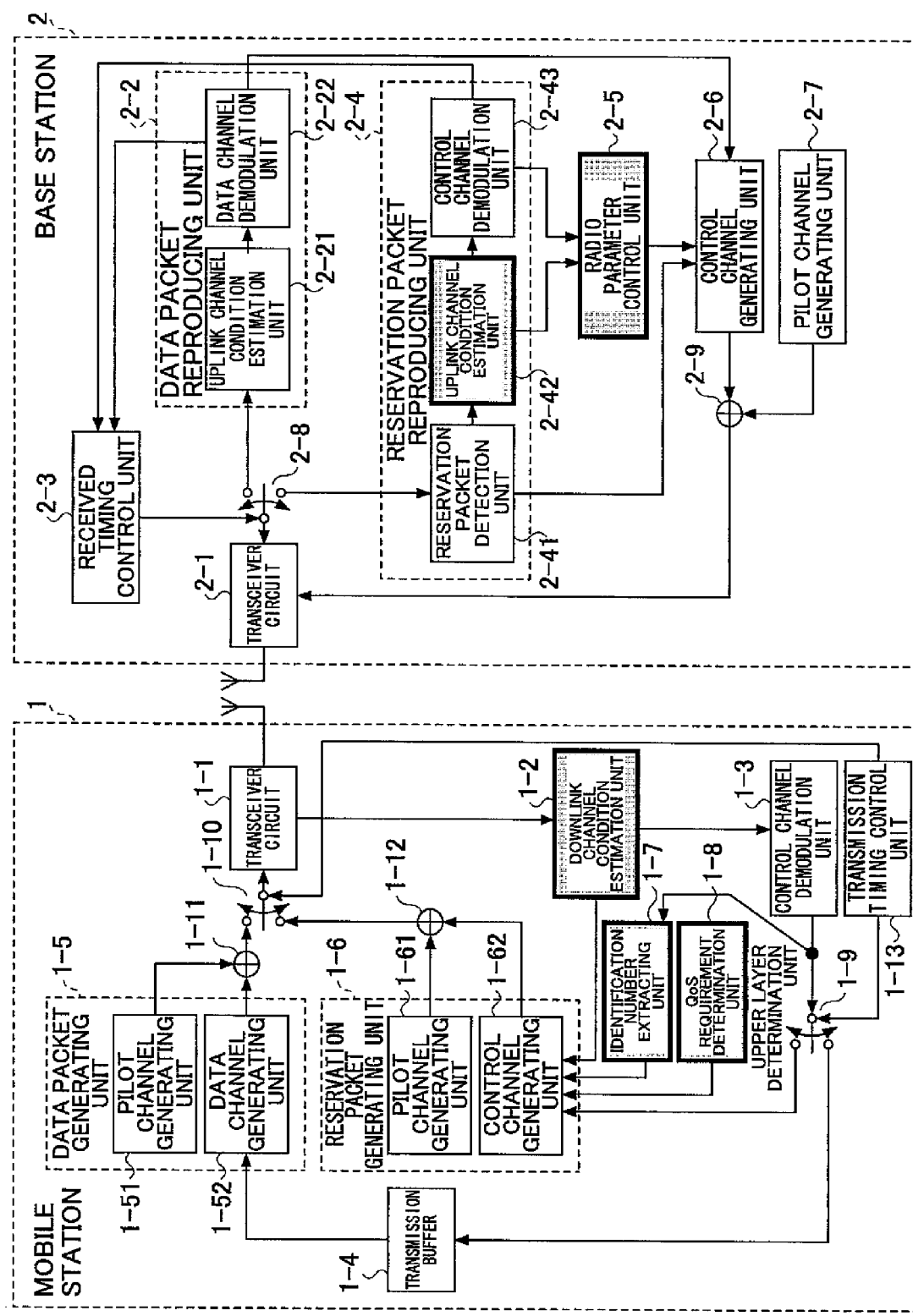
FIG. 1 shows a block diagram for illustrating a structure of a mobile communication system in accordance with an embodiment of the present invention.

Description of Notations 1 mobile station
2 base station
1-2 downlink channel condition estimation unit
1-7 identification number extracting unit
1-8 QoS requirement determination unit
2-42 uplink channel condition estimation unit
2-5 radio parameter control unit

BEST MODE OF CARRYING OUT THE INVENTION

A description of embodiments of the present invention is given below with reference to the accompanying drawings.

Throughout the drawings for illustrating the embodiments, corresponding elements are referenced by the same reference numerals, and the repetitive descriptions are omitted.

With reference to FIG. 1, a description is given below with regard to a mobile communication system in accordance with an embodiment of the present invention.

The mobile communication system in accordance with the present embodiment includes a mobile station 1 and a base station 2.

The mobile station 1 includes a transceiver circuit 1-1; adders 1-11 and 1-12 selectably connected to the transceiver circuit 1-1 by a switch 1-10; a transmission timing control unit 1-13 connected to the transceiver circuit 1-1 and the switch 1-10; a downlink channel condition estimation unit 1-2 connected to the transceiver circuit 1-1; a control channel demodulation unit 1-3 connected to the downlink channel condition estimation unit 1-2 and the transmission timing control unit 1-13; a transmission buffer 1-4 and a control channel generating unit 1-62 both selectably connected to the control channel demodulation unit 1-3 and the transmission timing control unit 1-13 by a switch 1-9; a data channel generating unit 1-52 connected to the transmission buffer 1-4 and the adder 1-11; a pilot channel (reference signal) generating unit 1-51 connected to the adder 1-11; an identification number extracting unit 1-7 and a QoS requirement determination unit 1-8 both connected to the control channel generating unit 1-62; and a pilot channel (reference signal) generating unit 1-61 and the switch 1-10 both connected to the adder 1-12. The control channel generating unit 1-62 is also connected to the downlink channel condition estimation unit 1-2 and the adder 1-12.

The pilot channel generating unit 1-51 and the data channel generating unit 1-52 are included in a data packet generating unit 1-5. The pilot channel generating unit 1-61 and the control channel generating unit 1-62 are included in a reservation packet generating unit 1-6.

The base station 2 includes a transceiver circuit 2-1; a received timing control unit 2-3 connected to the transceiver circuit 2-1; an uplink channel condition estimation unit 2-21 and a reservation packet detection unit 2-41 both connected to the transceiver circuit 2-1 and the received timing control unit 2-3 via a switch 2-8; a data channel demodulation unit 2-22 connected to the uplink channel condition estimation unit 2-21 and the received timing control unit 2-3; an uplink channel condition estimation unit 2-42 connected to the reservation packet detection unit 2-41; a control channel demodulation unit 2-43 connected to the uplink channel condition estimation unit 2-42 and the received timing control unit 2-3; a radio parameter control unit 2-5 connected to the uplink channel condition estimation unit 2-42 and the control channel demodulation unit 2-43; a control channel generating unit 2-6 connected to the reservation packet detection unit 2-41, the radio parameter control unit 2-5, and the data channel demodulation unit 2-22; an adder 2-9 connected to the control channel generating unit 2-6 and the transceiver circuit 2-1; and a pilot channel (reference signal) generating unit 2-7 connected to the adder 2-9.

The uplink channel condition estimation unit 2-21 and the data channel demodulation unit 2-22 are included in a data packet reproducing unit 2-2. The reservation packet detection unit 2-41, the uplink channel condition estimation unit 2-42, and the control channel demodulation unit 2-43 are included in a reservation packet reproducing unit 2-4.

The downlink channel condition estimation unit 1-2 in the mobile station 1 estimates a downlink channel condition by means of a pilot channel (reference signal) transmitted periodically or continuously from the base station 2. The estimated channel condition is input to the control channel generating unit 1-62, and a control channel is input to the control channel demodulation unit 1-3. The control channel demodulation unit 1-3 demodulates the control channel, and the demodulated control channel is input to the control channel generating unit 1-62.

The control channel generating unit 1-62 generates a control channel based on an identification number input from the identification number extracting unit 1-7, a QoS requirement input from the QoS requirement determination unit 1-8 and a downlink channel condition input from the downlink channel condition estimation unit 1-2. The generated control channel is combined with a pilot channel (reference signal) generated by the pilot channel generating unit 1-61, and then transmitted as a reservation packet from the transceiver circuit 1-1.

On the other hand, when the control channel demodulation unit 1-3 outputs a signal indicating detection of the reservation packet, the transmission buffer 1-4 inputs information bits to the data channel generating unit 1-52. Then, a data channel is generated by the data channel generating unit 1-52, then combined with a pilot channel (reference signal) generated by the pilot channel generating unit 1-52, and then transmitted as a data packet from the transceiver circuit 1-1.

The control channel demodulation unit 1-3 inputs a signal to the transmission timing control unit 1-13 indicating whether the signal corresponds to the control channel or the reservation packet. The transmission timing control unit 1-13 controls transmission timing for the switch 1-9 and the switch 1-10 based on the signal indicating whether it corresponds to the control channel or the reservation packet.

In the base station 2, when the transceiver circuit 2-1 receives the data packet, the uplink channel condition estimation unit 2-21 estimates an uplink channel condition by means of the received data packet. The estimated uplink channel condition is input to the data channel demodulation unit 2-22 along with the data channel. The data channel demodulation unit 2-22 demodulates the data channel based on the input uplink channel condition, and then a signal indicating whether the demodulation result includes an error is input to the received timing control unit 2-3 and the control channel generating unit 2-6.

On the other hand, when the transceiver circuit 2-1 receives the reservation packet, the reservation packet detection unit 2-41 detects the reservation packet. The uplink channel condition estimation unit 2-42 estimates an uplink channel condition by means of the detected reservation packet. The estimated uplink channel condition is input to the radio parameter control unit 2-5. In addition, the control channel is input to the control channel demodulation unit 2-43, and a signal indicating whether the demodulation result includes an error is input to the received timing control unit 2-3 and the radio parameter control unit 2-5.

The received timing control unit 2-3 controls received timing based on the signal indicating whether the demodulation result includes an error. The radio parameter control unit 2-5 controls a radio parameter based on the input uplink channel and the demodulated control channel, and inputs the result (or the radio parameter) to the control channel generating unit 2-6. The control channel generating unit 2-6 generates a control channel using the input radio parameter and the identification number for the mobile station. The generated control channel is combined with a pilot channel (reference signal) generated by the pilot channel generating unit 2-7, and then transmitted from the transceiver circuit 2-1 as a response to the reservation packet.

Next, a description of a communication control method in accordance with the present invention is given below with regard to a procedure for transmitting and receiving signals between the mobile station and the base station before the reservation packet is transmitted.

The reservation packet includes an identification number (hereinafter referred to as UE-ID), QoS, a data size, transmission power, and so on.

Figure 2A:
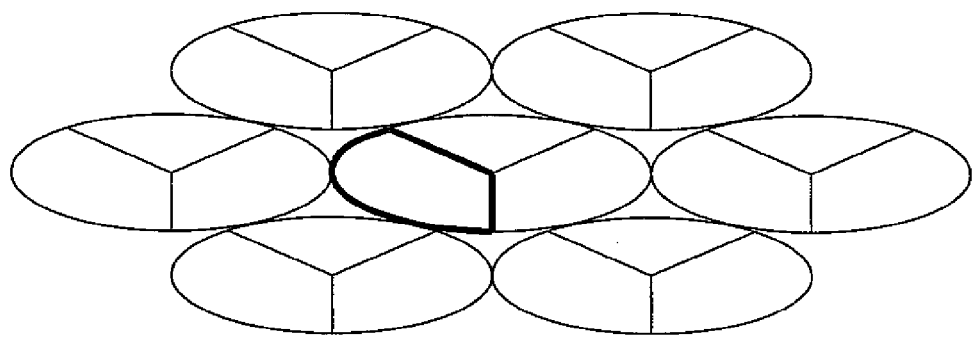
FIG. 2A shows a domain which manages a UE-ID used for a reservation packet.

The UE-ID used for the reservation packet is individually managed within each sector as shown in FIG. 2A. For example, the control channel generating unit 2-6 in the base station 2 manages the UE-ID used for the reservation packet within each sector. Making a unit (domain) in which the UE-ID is managed smaller in this manner allows for reducing the number of UE-IDs, thereby reducing the number of control bits used for the UE-ID in the reservation packet.

Figure 2B:
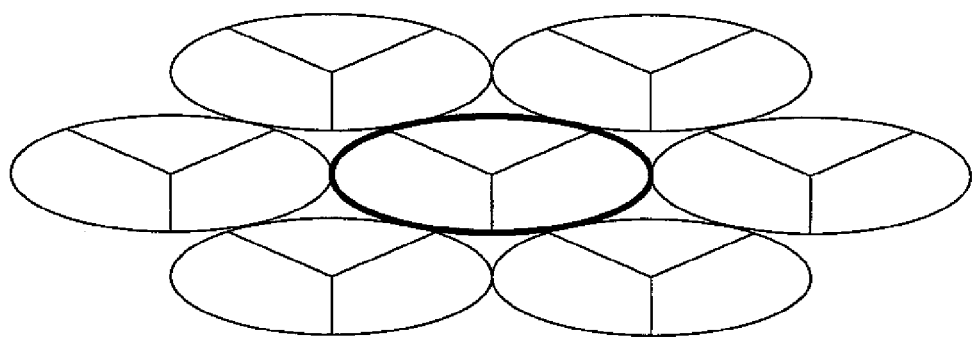
FIG. 2B shows a domain which manages a UE-ID used for a reservation packet.
Figure 2C:
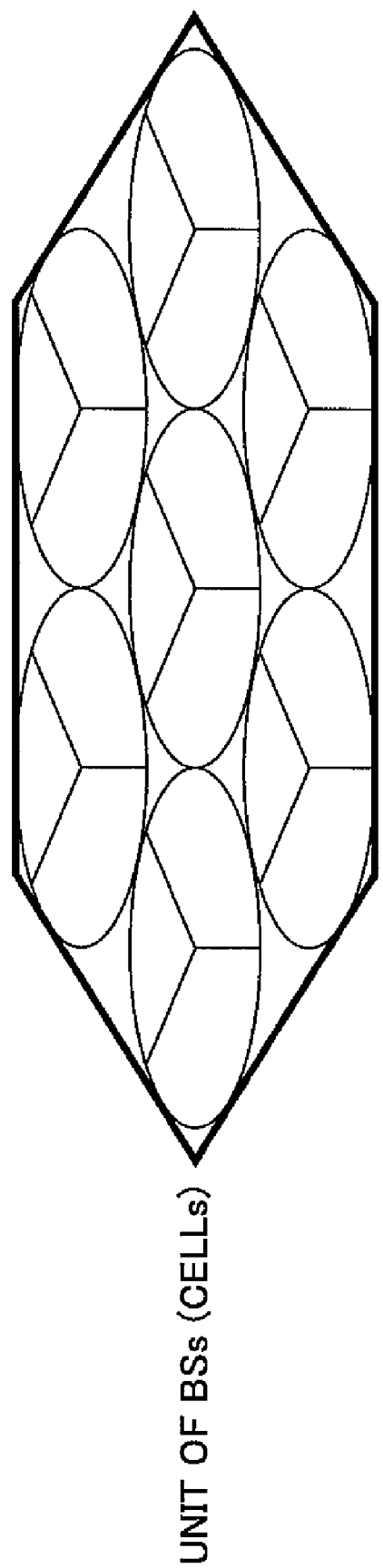
FIG. 2C shows a domain which manages a UE-ID used for a reservation packet.

Alternatively, the control channel generating unit 2-6 may manage the UE-ID within each base station as shown in FIG. 2B, or within each group of base stations as shown in FIG. 2C. The UE-ID may be managed within each operator. Making the domain (a unit in which the UE-ID is managed) larger in this manner allows for reducing the number of processes for acquiring a new UE-ID from the base station in the case of changing the domains. When the mobile station changes the domains during connection, Hand-Over is carried out. Thus, the mobile station may acquire a UE-ID during Hand-Over.

With reference to FIG. 3, a description is given below with regard to a method of acquiring a UE-ID used for the reservation packet.

When the mobile station negotiates with the network (base station) to acquire a UE-ID, reservation based packet access (or direct access without reservation) is used to transmit a L3 signaling message. Accordingly, the mobile station needs a certain ID at this moment.

However, because the mobile station 1 has not acquired the UE-ID yet, the mobile station 1 randomly selects one of temporary IDs provided for each domain. For example, assuming that 1024 IDs are provided within the domain, the identification number extracting unit 1-7 defines #0-#15 as temporary IDs, and the mobile station 1 randomly selects one of them. The number of temporary IDs is selected so as to fully decrease the probability that multiple mobile stations use the same temporary ID at the same time.

The identification number extracting unit 1-7 transmits Full-UE-ID to the network by reservation based packet access (or direct access) with the use of the temporary ID, and requests a UE-ID.

Then, the UE-ID is allocated in the network and transmitted to the mobile station on a downlink shared data channel. For example, the control channel generating unit 2-6 in the base station 2 allocates the UE-ID and transmits the UE-ID to the mobile station on the downlink shared data channel. Afterward, the mobile station 1 uses the received UE-ID to perform packet access.

A description is given below with regard to a procedure for acquiring the UE-ID used for the reservation packet.

Before acquiring a UE-ID, the mobile station 1 uses the temporary ID for packet access. After acquiring the UE-ID, the mobile station 1 uses the UE-ID for packet access.

First, the identification number extracting unit 1-7 in the mobile station 1 transmits a reservation packet to the base station 2 (Step S302). This reservation packet is a packet used to make a reservation for a L3 control signal for negotiation.

The base station 2 transmits an ACK for the reservation packet on a downlink shared control channel, for example (Step S304).

Then, the control channel generating unit 2-6 in the base station 2 transmits transmission allocation on the downlink shared control channel, for example (Step S306).

The identification number extracting unit 1-7 in the mobile station 1 transmits data to the base station 2 (Step S308). This data is the L3 control signal for negotiation. The ACK/NACK for an uplink shared data channel is omitted here.

The control channel generating unit 2-6 in the base station 2 performs downlink data transmission (Step S310). This data is the L3 control signal for negotiation and includes a UE-ID to be used.

Then, the reservation packet generating unit 1-6 in the mobile station 1 transmits a reservation packet for making a reservation for user data.

Afterward, data transmission is performed with reservation based packet access.

Figure 4:
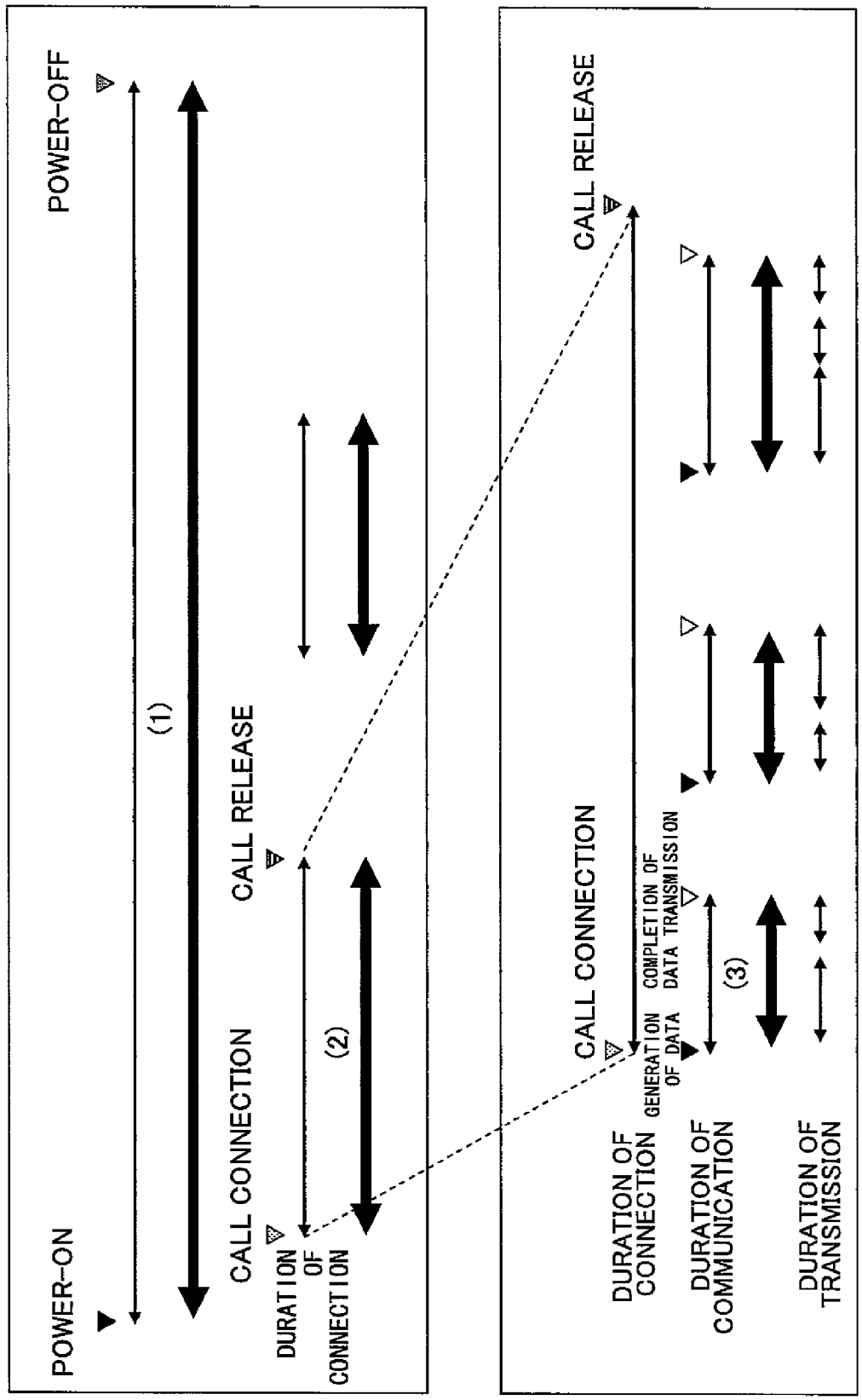
FIG. 4 shows timing for acquiring a UE-ID used for a reservation packet.

With regard to FIG. 4, a description is given below with regard to timing for acquiring a UE-ID used for the reservation packet.

The mobile station 1 acquires a UE-ID at power-on (upon registering in the network), and maintains it until power-off (1). In this case, even if the mobile station is in an idle status, for example, the mobile station re-acquires a UE-ID upon changing domains in which the UE-ID is managed due to movement of the mobile station. In this manner, the mobile station 1 maintains the UE-ID all the time, and thus is able to transmit data with reservation based packet access or direct access immediately when data is generated.

Alternatively, the mobile station 1 may acquire a UE-ID when data is initially generated (at connection), and maintain it until the completion of the connection (2). In this case, the mobile station re-acquires a UE-ID upon changing domains in which the UE-ID is managed due to movement of the mobile station during connection. In this manner, the mobile station 1 maintains the UE-ID all the time during connection except initial communications, and thus is able to transmit data immediately when data is generated thereafter. Compared to the aforementioned approach (1), the number of UE-IDs can be reduced, because the mobile station acquires a UE-ID only when necessary. Specifically, memory capacity in the network and the number of bits for UE-IDs can be reduced.

In addition, compared to the aforementioned approach (1), the mobile station need not re-acquire a UE-ID upon changing domains in which the UE-ID is managed during the idle status (during disconnection), and thus the work load of control signals can be reduced.

Alternatively, the mobile station 1 may acquire a UE-ID at the start of communications, and maintain it until the completion of communications (3). In this case, the mobile station 1 re-acquires a UE-ID upon changing domains in which the UE-ID is managed due to movement of the mobile station during communications. In this manner, although the mobile station needs to acquire a UE-ID every time when data is generated, the number of UE-IDs can be reduced. Compared to the aforementioned approaches (1) and (2), the mobile station need not re-acquire a UE-ID upon changing domains in which the UE-ID is managed while communications are not performed, and thus the work load of control signals can be reduced.

Figure 5:
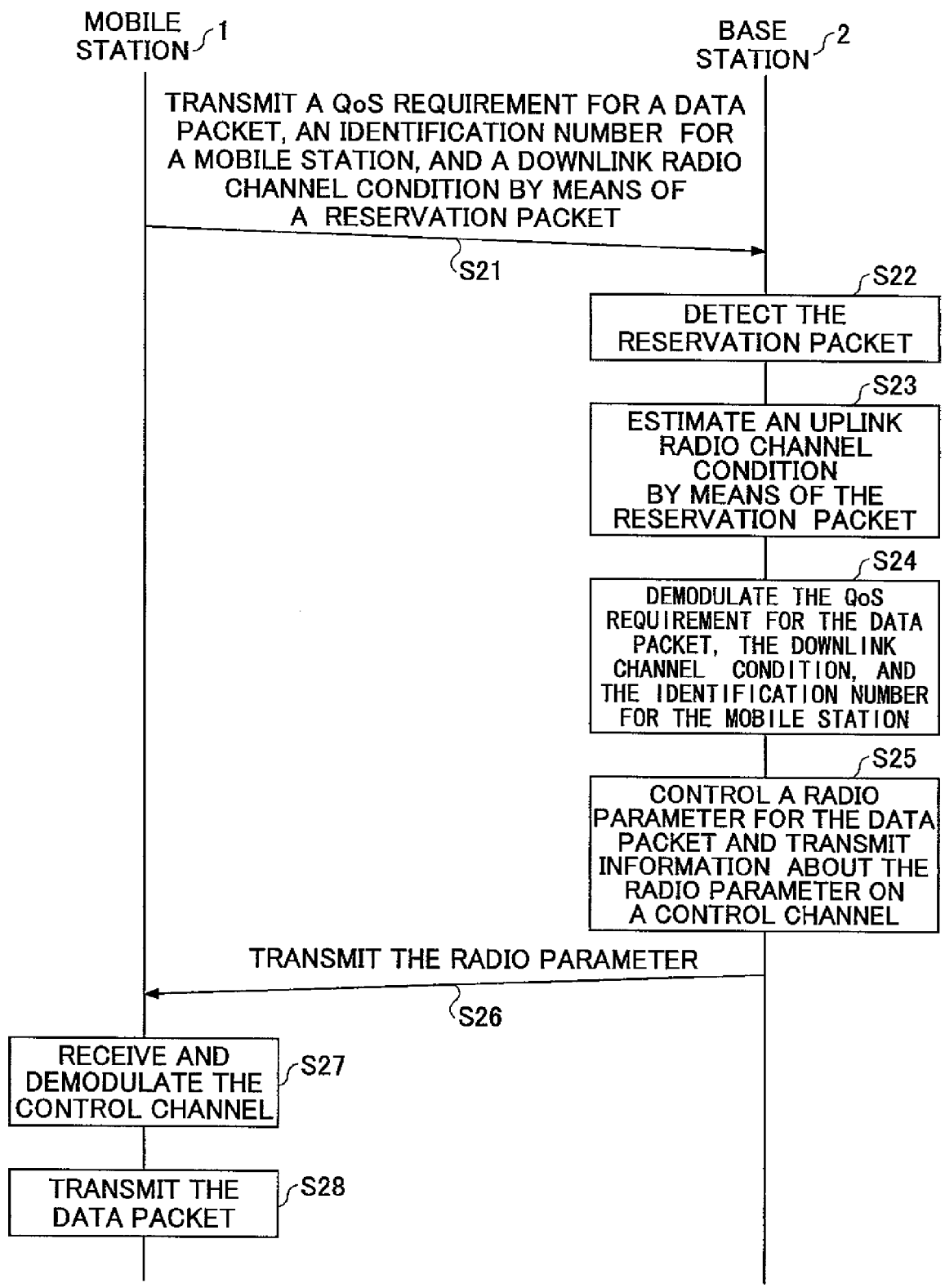
FIG. 5 shows a sequence diagram for illustrating a control flow between the step of transmitting a reservation packet and the step of transmitting a data packet in a mobile communication system in accordance with an embodiment of the present invention.

With reference to FIG. 5, a description is given below with regard to a procedure for transmitting and receiving signals between the mobile station and the base station between the step of transmitting a reservation packet and the step of transmitting a data packet in accordance with the present embodiment.

The mobile station 1 transmits, on a control channel for a reservation packet, a QoS (quality of service) requirement for a data packet, the identification number for the mobile station, and the radio channel condition measured on the downlink (Step S21). Alternatively, the mobile station 1 may transmit a data size of transmission data on the control channel for the reservation packet. For example, the mobile station uses a certain fundamental unit as the type of the data size and transmits the fundamental unit on several occasions. For example, the mobile station uses 1 PDU=40 bytes as a fundamental unit. In this manner, the mobile station can transmit a data size with fewer information bits in the case where the data size increases in range.

Alternatively, the mobile station may use a predetermined threshold and transmit the data size based on the predetermined threshold. For example, if the data size is below the threshold, the mobile station transmits the data size. Otherwise, the mobile station transmits notification that the data size is more than or equal to the threshold. For example, 8 bits may be used for the data size, where 0-254 of the 8 bits represents the number of PDUs and 255 of the B bits represents that the data size is more than or equal to 255 PDUs.

Alternatively, the mobile station 1 may transmit information about transmission power on the control channel for the reservation packet.

When the base station 2 detects the reservation packet transmitted from the mobile station 1 (Step S22), the base station 2 estimates an uplink radio channel condition by means of the reservation packet (Step S23).

Then, the base station 2 demodulates the received QoS requirement, the identification number for the mobile station, and the radio channel condition measured on the downlink (Step S24).

Then, the base station 2 controls a radio parameter for the data packet based on the QoS requirement and the radio channel condition, and transmits information about the radio parameter to the identified mobile station on a control channel (Steps S25 and S26).

The mobile station 1 receives and demodulates the control channel transmitted from the base station 2 (Step S27), and transmits the data packet using the received radio parameter (Step S28).

In Step S27, when the mobile station 1 does not receive an acknowledgement signal for the reservation packet included in the downlink control channel, the mobile station 1 retransmits the reservation packet in the case where the number of retransmissions does not reach the maximum value.

As shown in FIG. 1 and FIG. 5, the mobile station 1 transmits the QoS requirement for the data packet, the identification number for the mobile station 1 and the downlink radio channel condition to the base station 2. Then, the base station 2 estimates the uplink channel condition by means of the received reservation packet, and centrally controls the radio parameter based on the result of estimating the uplink radio channel condition, the QoS requirement, and the downlink radio channel condition. This approach (which controls the radio parameter) can reduce transmission power while satisfying the QoS requirement, compared to the approach without controlling the radio parameter based on the radio channel condition. In other words, link capacity can be increased.

Figure 6:
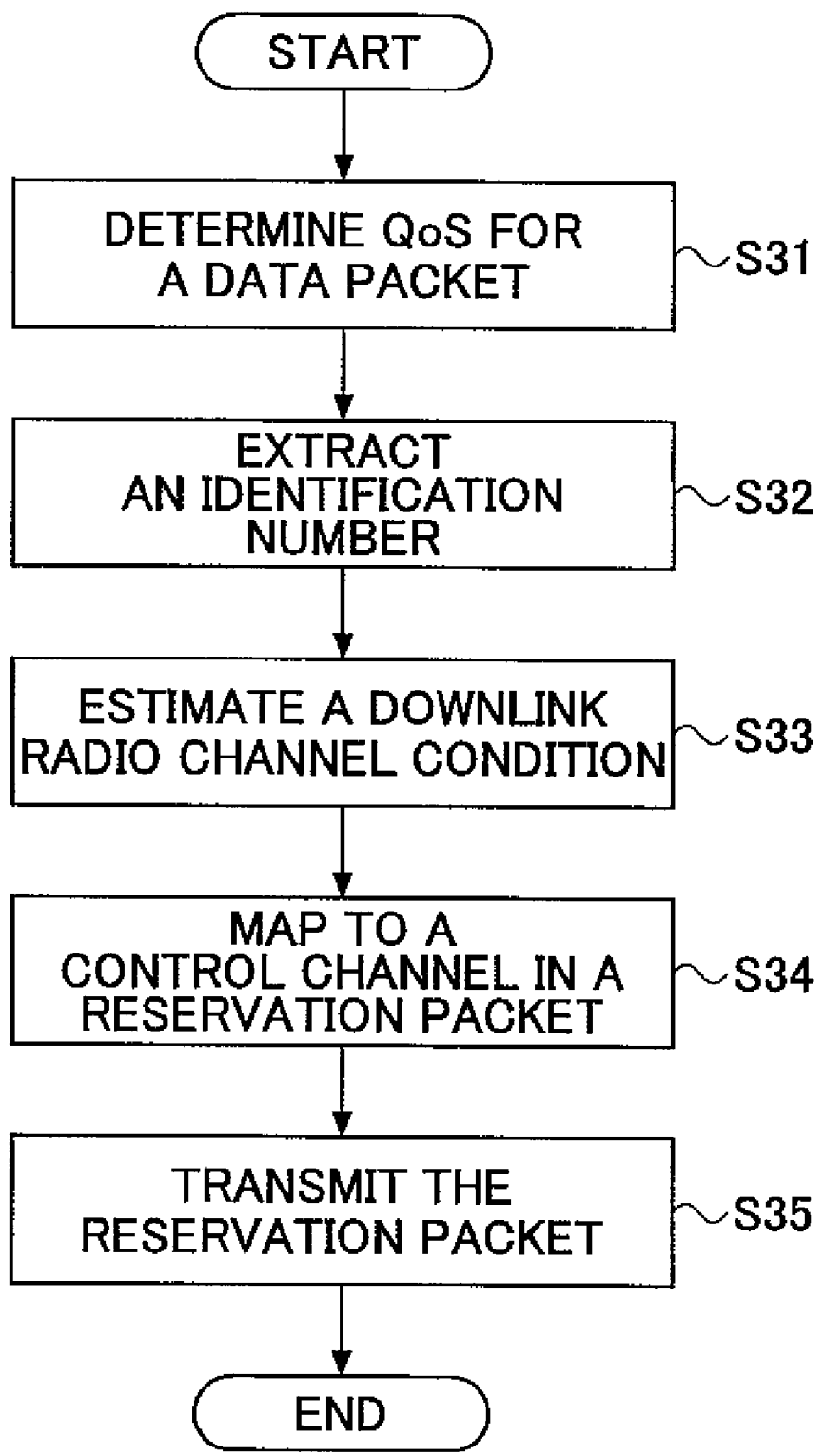
FIG. 6 shows a flowchart for illustrating a procedure before a mobile station transmits a reservation packet in a mobile communication system in accordance with an embodiment of the present invention.

With reference to FIG. 6, a description is given below with regard to a procedure before the mobile station transmits a reservation packet in the mobile communication system in accordance with the present invention.

First, the mobile station 1 determines a QoS requirement for a data packet which is defined by an acceptable delay, an acceptable residual error rate, and a desired information transmission rate (data size) (Step S31). Then, the mobile station 1 extracts an identification number for the mobile station 1 (Step S32). Then, the mobile station 1 estimates a downlink radio channel condition which is defined by the level of path-loss, the maximum Doppler frequency, the number of paths, a delay spread, DOA (direction of arrival), and so on (Step S33).

Then, the mobile station 1 maps the determined QoS requirement, the extracted identification number, and the estimated downlink radio channel condition to a control channel in the reservation packet for transmission (Steps S34 and S35).

On the downlink, the mobile station can accurately estimate the downlink channel condition by means of a pilot channel (reference signal), which is transmitted periodically or continuously. In addition, even if the signal bandwidth and the frequency band of the uplink are different from those of the downlink, the average uplink channel condition shows a strong correlation with the average downlink channel condition. Thus, transmitting from the mobile station the downlink channel condition as well as the QoS requirement by means of the reservation packet in advance allows the base station to control the radio parameter in accordance with the channel condition while satisfying the QoS requirement. As a result, the mobile station 1 can reduce transmission power which satisfies required quality.

Figure 7:
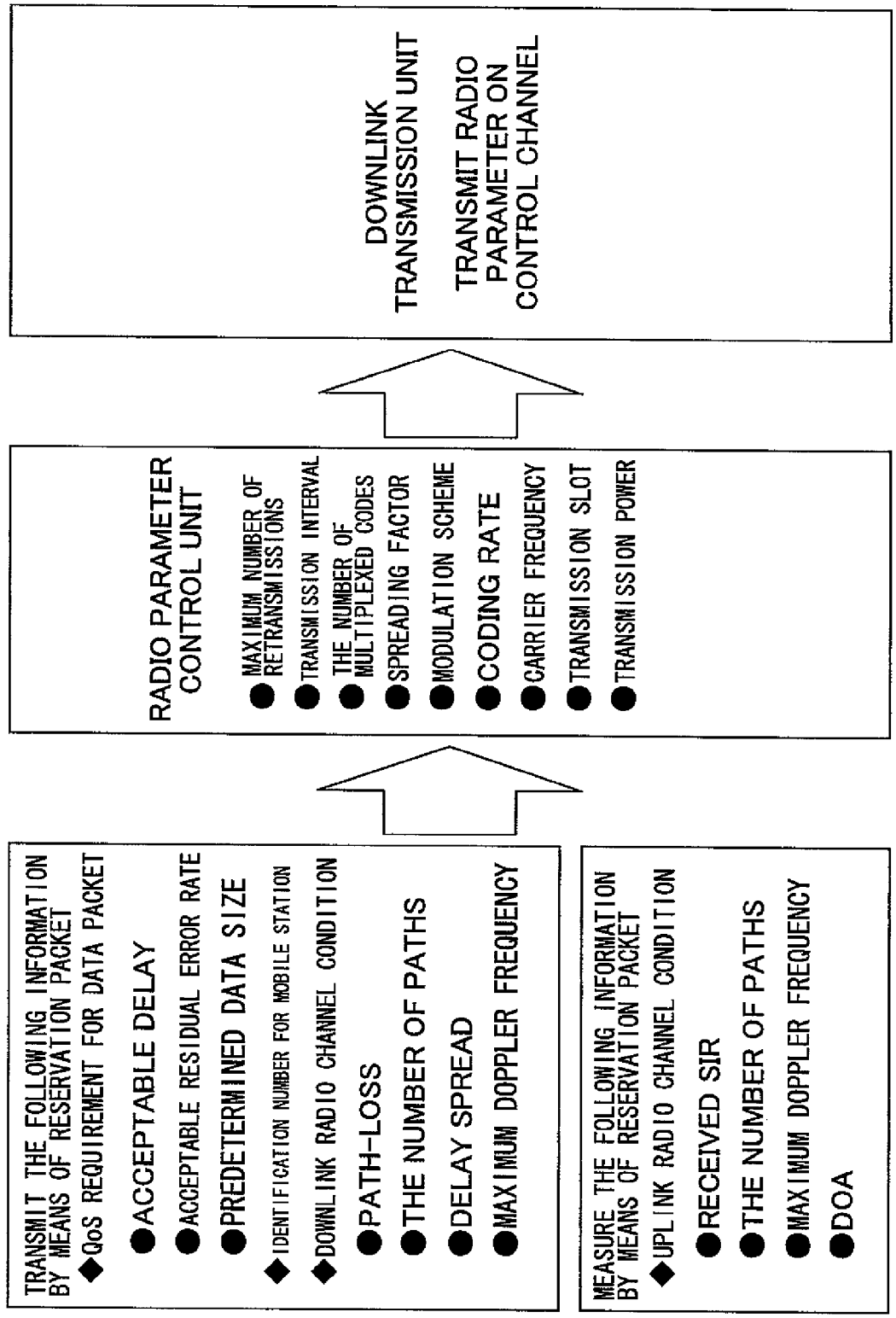
FIG. 7 shows a diagram for illustrating an operation of a radio parameter control unit in a base station in accordance with an embodiment of the present invention.

With reference to FIG. 7, a description is given below with regard to an operation of the radio parameter control unit 2-5 in the base station 2.

A QoS requirement for a data packet, a downlink radio channel condition, and an identification number for the mobile station, which are transmitted by means of a reservation packet, are demodulated in the control channel demodulation unit 2-43, and input to the radio parameter control unit 2-5. It should be noted that the QoS requirement is defined by an acceptable delay, an acceptable residual error rate, a desired data size, and so on, and that the downlink channel condition is defined by the level of path-loss, the maximum Doppler frequency, the number of paths, a delay spread, DOA, and so on.

Also, the uplink radio channel condition measured by means of the reservation packet is input to the radio parameter control unit 2-5. It should be noted that the uplink radio channel condition is defined by received quality, the maximum Doppler frequency, the number of paths, a delay spread, DOA, and so on. It should be also noted that the received quality can be expressed by either power or a power ratio, such as received signal code power or SIR (signal-to-interference power ratio).

The radio parameter control unit 2-5 determines a radio parameter based on input information, and operates based on the determined radio parameter. It should be noted that the radio parameter is defined by the maximum number of retransmissions, a transmission interval, the number of multiplexed codes, a spreading factor, a modulation scheme, a coding rate, a carrier frequency, a transmission slot, transmission power, and so on.

Then, a downlink transmission unit (not shown) in the transceiver circuit 2-1 transmits the determined radio parameter to the mobile station 1 on a control channel.

Figure 8:
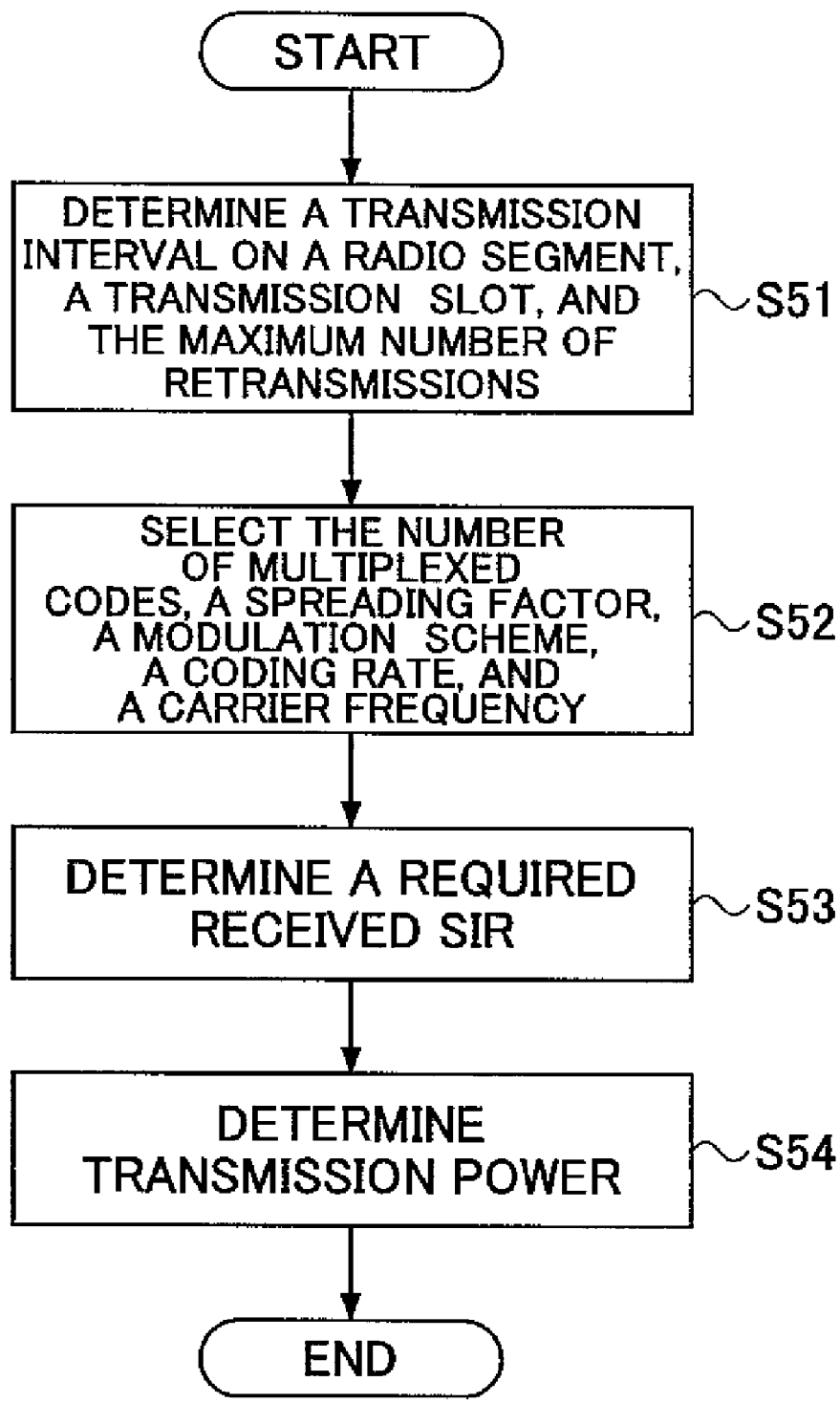
FIG. 8 shows a flowchart for illustrating a procedure for controlling a radio parameter in a base station in accordance with an embodiment of the present invention.

With reference to FIG. 8, a description is given below with regard to a procedure for controlling a radio parameter in the base station 2 in accordance with the present embodiment.

The base station determines a transmission interval on a radio segment, a transmission slot, and the maximum number of retransmissions based on an acceptable delay, the level of path-loss and ODA (Step S51).

It should be noted that the time diversity effect caused by retransmission can be reduced when the transmission interval is set to a smaller value, and that the delay can be increased when the transmission interval is set to a larger value. Therefore, it is necessary to select an optimum transmission interval in view of the acceptable delay and the time diversity effect.

In addition, giving priority to RT traffic with a strict acceptable delay upon allocating a transmission slot can reduce packet loss probability, and can satisfy requirements for delay. Moreover, the base station gives priority to the mobile station 1 with a smaller path-loss upon allocating a transmission slot. This is because the maximum value of transmission power is determined in the mobile station 1, and thus the mobile station with a smaller path-loss can increase received power (SIR)

In addition, when the base station 2 uses an adaptive antenna with the antenna beam aimed at multiple users and gives grants of transmitting data packets for the users, the base station 2 selects users with mutually wide DOA rather than users with mutually narrow DOA. This can improve the received SIR at the base station, thereby reducing transmission power which satisfies the QoS requirement for the data packet.

Then, the base station selects optimum values for the number of multiplexed codes, a spreading factor, a modulation scheme, a coding rate, and a carrier frequency based on the desired data size and the received SIR (Step S52).

When the desired data size is larger, the base station selects the number of multiplexed codes, a spreading factor, a modulation scheme, and a coding rate, which have a faster information transmission rate. In addition, using a carrier frequency with a higher received SIR (with a better channel condition or less traffic) can reduce transmission power which satisfies required quality for the data packet.

Then, the base station determines a required received SIR which satisfies an acceptable residual error rate in the data packet, based on the measured number of paths, the maximum Doppler frequency, and the maximum number of retransmissions of data packets (Step S53).

This is because RT traffic has a smaller acceptable delay (i.e. the maximum number of retransmissions of a data packet is smaller) and the time diversity effect is smaller. Therefore, the received SIR which satisfies required quality is significantly caused by the Rake diversity effect in accordance with the number of paths. In addition, as the maximum Doppler frequency increases, the accuracy of detecting received timing and the accuracy for channel estimation degrade, and the received SIR which satisfies required quality can increase.

Then, the base station determines transmission power based on the received SIR for the reservation packet and the required received SIR for the data packet (Step S54). Specifically, the base station controls the ratio between transmission power of the reservation packet and that of the data packet to determine transmission power which satisfies required quality.

When the base station 2 determines the radio parameter, the base station 2 transmits information about the radio parameter used for the data packet to the identified mobile station on a downlink control channel.

With reference to Table 1, a description is given below with regard to notation of a desired data size included in a QoS requirement which the mobile station transmits with the use of control bits.

TABLE 1 notation of data sizes with the use of control bits

| Index | Number of bytes (KB) | Transmission data |
|---|---|---|
| 1 | 64 | 1 |
| 2 | 128 | 2 |
| . | . | . |
| . | . | . |
| . | . | . |
| N | 64*N | N |

The data size is defined by an index, the data size, and transmission data. The index and the transmission data are expressed as an integer 1-N, and the data size is expressed as the number of bytes (KB), the number of bits, the number of PDUs (Packet Data Units), or the like. When the number of bits is used, the data size can be determined in detail due to a smaller information unit. When the number of bytes or the number of PDUs is used, the number of information bits can be reduced due to a larger information unit.

Assuming that the minimum value of the data size is defined as 64*1 (KB), the maximum value of the data size is defined as 64*N (KB), and the step size is defined as 64 (KB), $\log_2 N$ bits are required to transmit the data size.

With reference to Table 2, a description is given below with regard to notation of both an acceptable error rate and an acceptable delay included in a QoS requirement which the mobile station transmits with the use of control bits.

TABLE 2a notation in the case of transmitting Index with an acceptable residual error rate and Index with an acceptable delay separately

| Index | Acceptable residual block error rate | Transmission data |
|---|---|---|
| 1 | $10^{-1}$ | 1 |
| 2 | $10^{-2}$ | 2 |
| . | . | . |
| . | . | . |
| . | . | . |
| M | $10^{-M}$ | M |

| Index | Acceptable delay (ms) | Transmission data |
|---|---|---|
| 1 | 5 | 1 |
| 2 | 10 | 2 |
| . | . | . |
| . | . | . |
| . | . | . |
| N | 5*N | N |

TABLE 2b notation in the case of transmitting Index with an acceptable error rate and an acceptable delay together
(The values in the table represent Index.)

| | | Acceptable delay (ms) | | |
|---|---|---|---|---|
| | 5*1 | 5*2 | ... | 5*N |
| Acceptable residual block error rate | $10^{-1}$ | 1 | 2 | ... | |
| | $10^{-2}$ | | | ... | |
| | . | . | . | | |
| | . | . | . | | |
| | . | . | . | | |
| | $10^{-M}$ | | | ... | M*N − P |

(P: the number of entries which are not used in the above table)

The acceptable residual error rate can be defined by an acceptable residual block error rate, an acceptable residual PDU error rate, an acceptable residual packet error rate, or the like. For example, the acceptable residual error rate is defined as the acceptable residual block error rate $10^{-m}$ (m: a positive integer), and the acceptable delay is defined in increments of 5 ms.

If the mobile station transmits an Index with the acceptable residual error rate and an Index with the acceptable delay separately, the maximum value, the minimum value, and the step size of the acceptable residual error rate are defined as $10^{-1}$, $10^{-M}$ and $10^{-1}$, respectively, and the minimum value, the maximum value, and the step size of the acceptable delay are defined as 5, 5*N and 5, respectively, as shown in Table 2(a), for example. In this case, $\log_2 M$ bits and $\log_2 N$ bits are required to transmit the acceptable residual error rate and the acceptable delay, respectively.

Alternatively, taking observed traffic into consideration, the acceptable residual error rate and the acceptable delay can be combined, as shown in Table 2(b), for example, because there is a correlation between the acceptable residual error rate and the acceptable delay. In this manner, the number of Indexes can be reduced by P, compared to the notation of Table 2(a). Therefore, the number of bits used for transmitting the acceptable residual error rate and the acceptable delay together is determined as $\log_2(M*N-P)$. Accordingly, the number of bits used for transmission can be reduced by $\log_2((M*N)/(M*N-P))$ bits compared to the notation of Table 2(a).

Alternatively, the mobile station 1 may transmit the QoS requirement by means of a Queue-ID.

The mobile station 1 (logically or physically) includes a buffer for each QoS class of data, in order to perform communications with the use of different QoS classes.

A Queue-ID represents an identifier indicating the type of data when the same mobile station 1 transmits several types of data with different QoS classes. For example, the Queue-ID is used for differentiating between voice data and image data, or identifying a L3 signaling message such as a Hand-Over control signal.

When the mobile station 1 requests a reservation for data, the mobile station 1 transmits to the base station 2 a QoS class to which the data belongs. The base station 2 can efficiently perform scheduling, taking the QoS class into consideration. For example, the mobile station 1 transmits information about a service request class which corresponds to multiple QoS requirements. After a reservation is made for data with a certain QoS class, when data with a different QoS class is generated during communications (under the scheduling condition), the mobile station requests a reservation for the data again to notify the base station 2 that the data with the different QoS class is generated.

With regard to FIGS. 9A and 9B, a description is given below with regard to correspondences between Queue-IDs and QoS classes.

The correspondence between Queue-IDs and QoS classes can be either predetermined in the system (1) or determined by an association table after the negotiation between the mobile station and the network at connection (2).

In the case of (1), the mobile station 1 transmits an identifier for a QoS class associated with transmission data. In the case of (1), the mobile station 1 does not need the negotiation with the network at connection. In the case of (2), the mobile station 1 determines an identifier for a QoS class associated with transmission data. For example, the mobile station notifies the network that the mobile station transmits data with the following QoS class: (acceptable delay, acceptable residual packet error rate)=(x1, y1), (x2, y2). In the case of (2), the number of bits for control signals used for the Queue-ID can be reduced.

Figure 10:
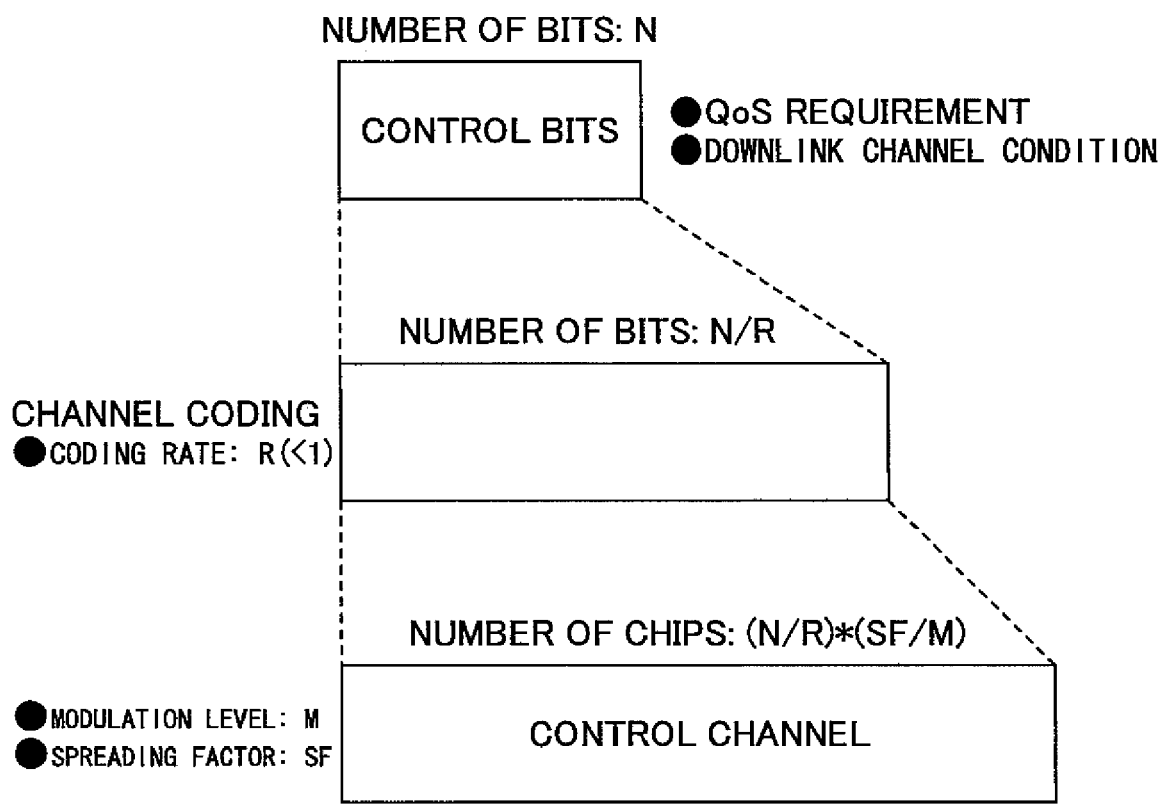
FIG. 10 shows a diagram for illustrating a procedure for generating a control channel in a mobile station in accordance with an embodiment of the present invention.

With reference to FIG. 10, a description is given below with regard to a procedure for performing channel-coding (coding rate: R<1) for control bits including a QoS requirement, an identification number for the mobile station, and a downlink channel condition, and generating a control channel in the mobile station in accordance with the present embodiment.

First, the mobile station performs channel-coding for control bits with the number of bits N. After channel-coding, the number of bits becomes N/R so that error correcting capability can be enhanced. Because the number of control bits is relatively smaller than the number of bits for the data packet, the coding gain can be achieved using a channel-coding method suitable for control bits, such as Reed-Muller codes described in "3GPP RAN, 3G TS 25.212 V3.5.0, December 2000".

Then, the mobile station performs modulation (modulation level: M) and spreading (spreading factor: SF) for the channel-coded control bits. The control bits after modulation and spreading are mapped to a control channel for transmission.

Figure 11A:
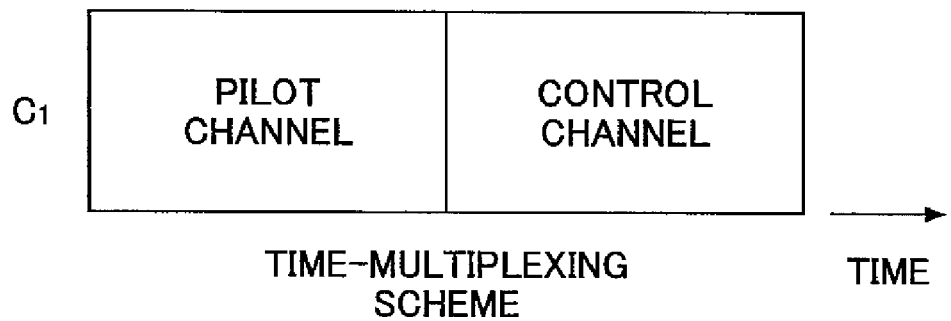
FIG. 11A shows a structure of a time-multiplexed reservation packet in a mobile station in accordance with an embodiment of the present invention.
Figure 11B:
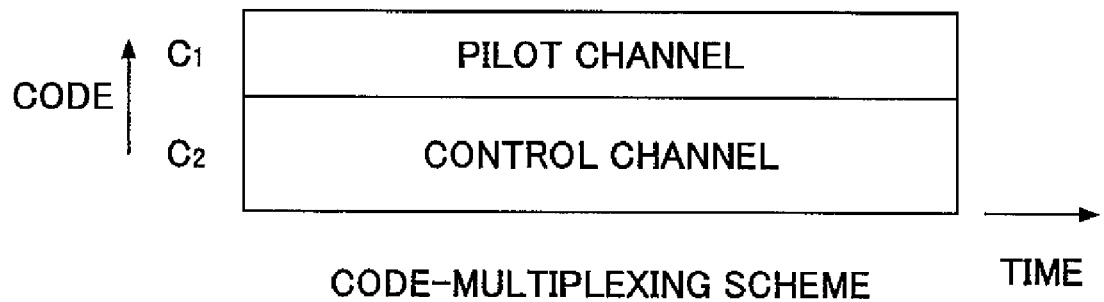
FIG. 11B shows a structure of a code-multiplexed reservation packet in a mobile station in accordance with an embodiment of the present invention.
Figures 11C, 12A:
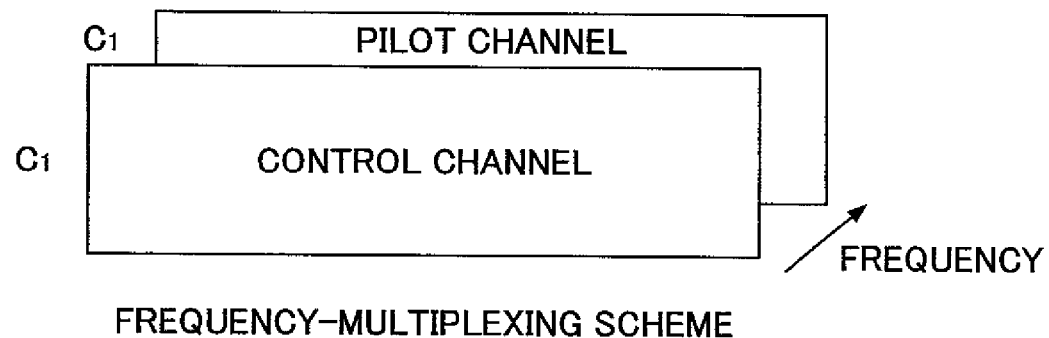
FIG. 11C shows a structure of a frequency-multiplexed reservation packet in a mobile station in accordance with an embodiment of the present invention.
FIG. 12A shows a structure of a reservation packet in a mobile station in accordance with an embodiment of the present invention.

With reference to FIGS. 11A-11C, a description is given below with regard to structures of reservation packets transmitted from the mobile station in accordance with the present invention.

The mobile station 1 generates the reservation packet by time-multiplexing a pilot channel (reference signal) for estimating a channel condition with a control channel for providing a QoS requirement and a downlink channel condition, as shown in FIG. 11A. Alternatively, the mobile station 1 code-multiplexes or frequency-multiplexes the pilot channel with the control channel, as shown in FIG. 11B or FIG. 11C. Any multiplexing scheme may be used.

As shown in FIG. 11A, the time-multiplexing scheme can reduce the probability of collisions with packets for the other users, because only one spreading code is used.

As shown in FIG. 11B, the code-multiplexing scheme can improve the accuracy of following (tracking) time fluctuations of the channel response, because the pilot channels are multiplexed sequentially along the time axis.

As shown in FIG. 11C, the frequency-multiplexing scheme can reduce the probability of collisions with packets for the other users, because only one spreading code is used, as is the case with the time-multiplexing scheme.

Structures of reservation packets are also shown in FIGS. 12A-12C, when a QoS requirement is transmitted by means of a Queue-ID. It is assumed that the mobile station transmits a Queue-ID, a data size and transmission power on a control channel for a reservation packet. It should be noted that the mobile station may transmit part of them, or may transmit the other information together.

As shown in FIG. 12A, the mobile station 1 transmits a reservation packet after adding a UE-ID, a Queue-ID, a data size, transmission power, and a CRC when necessary.

Alternatively, as shown in FIG. 12B, the mobile station 1 may transmit a reservation packet after adding a Queue-ID, a data size, transmission power, and a CRC when necessary.

Alternatively, as shown in FIG. 12C, the mobile station 1 may transmit a reservation packet after adding a Queue-ID, a data size, transmission power, and a UE-specific CRC.

With reference to FIGS. 13A-15B, a description is given below with regard to methods of transmitting a reservation packet in the mobile station in accordance with the present embodiment.

Throughout FIGS. 13A-15B, "R" represents a reservation packet, "D" represents a data packet, and "P" represents a pilot channel.

The following description is given in terms of both burst-generated traffic such as high-speed data communications and periodically generated traffic such as voice communications.

First, methods of transmitting a reservation packet for high-speed data communication traffic will be described. Because the high-speed data communication traffic is burst-generated, multiple slots are reserved according to the data size. Then, a radio parameter is controlled. The radio parameter for only the initial data packet may be controlled, or the radio parameter for every data packet may be controlled.

Figure 13A:
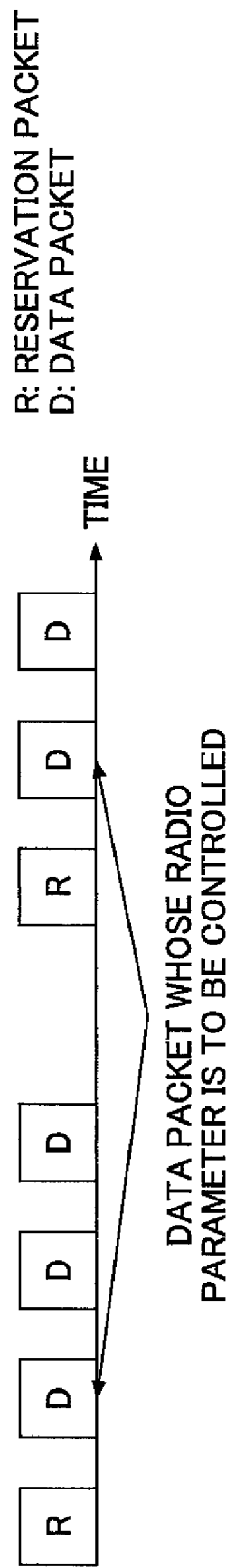
FIG. 13A shows a diagram for illustrating a method of transmitting a reservation packet in a mobile station in accordance with an embodiment of the present invention.

In the case where the radio parameter for only the initial data packet is controlled, the radio parameter for the initial data packet is controlled and the radio parameters for the subsequent data packets are determined to be identical with that for the initial data packet, as shown in FIG. 13A.

Using this method, a channel condition is estimated by means of a reservation packet and a downlink pilot channel (downlink reference signal). Compared to the method of transmitting a reservation packet for every data packet, this method can reduce header losses with the increase in the data size. In addition, because this method controls the radio parameter for only the initial data packet, this method can simplify control for radio parameters for the subsequent data packets.

In the case where the radio parameter for every data packet is controlled, a channel condition is estimated by means of a reservation packet and a downlink pilot channel as well as a previous data packet. In this manner, accurate control for the radio parameter for every data packet is achieved in consideration of the QoS requirement and the channel condition. Again, compared to the method of transmitting a reservation packet for every data packet, this method can reduce header losses with the increase in the data size.

Second, methods of transmitting a reservation packet for periodically generated traffic such as voice communications will be described.

The following description is given in terms of both transmitting a reservation packet according to generation of a data packet and reserving multiple periodic slots.

In the case of transmitting a reservation packet according to generation of a data packet, it is assumed that the packet size of each voice packet is relatively small and the packets arrive periodically. Accordingly, when the number of slots to be reserved for the data packet is determined to be one, accurate control for the radio parameter is achieved, because the channel condition is estimated by the reservation packet transmitted for every data packet. In addition, the channel condition can be estimated by means of the reservation packet and the downlink pilot channel.

In the case of reserving multiple periodic slots, the radio parameter for only the initial data packet may be controlled, the radio parameter for every data packet may be controlled, or the radio parameter for every data packet may be controlled by transmitting a pilot channel before every data packet.

Figure 14A:
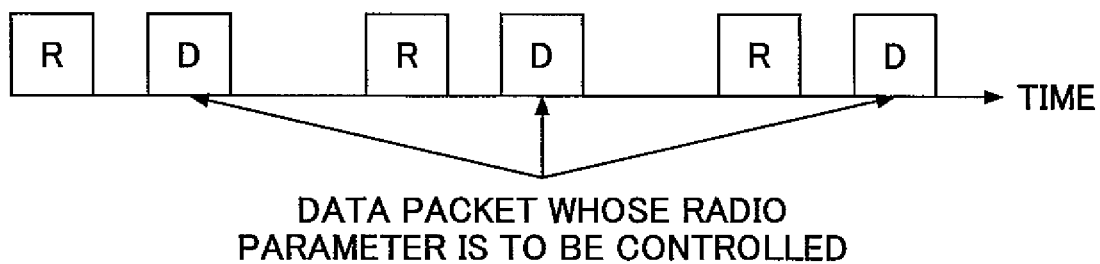
FIG. 14A shows a diagram for illustrating a method of transmitting a reservation packet according to generation of a data packet in a mobile station in accordance with an embodiment of the present invention.
Figure 14B:
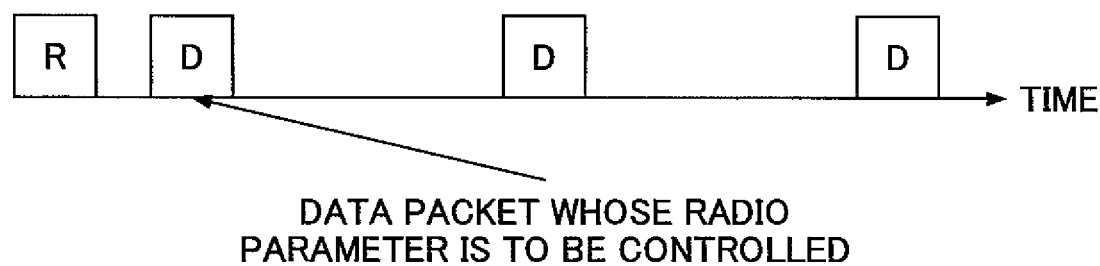
FIG. 14B shows a diagram for illustrating a method of transmitting a reservation packet for reserving periodic slots in a mobile station in accordance with an embodiment of the present invention.

In the case where the radio parameter for only the initial data packet is controlled, the mobile station transmits a reservation packet and reserves multiple periodic slots, as shown in FIG. 14B. Then, the radio parameter for only the initial data packet is controlled, and the radio parameters for the subsequent data packets are determined to be identical with that of the initial data packet. If QoS requirements for data packets which arrive periodically do not change, the transmission interval between reservation packets can be increased, thereby reducing both header losses and interference with the other users. Compared to the method of transmitting a reservation packet for every data packet, this method can reduce header losses. In addition, this method can simplify control for radio parameters for the subsequent data packets.

In the case where the radio parameter for every data packet is controlled, a channel condition for each data packet is estimated by means of a reservation packet and a downlink pilot channel as well as a pilot channel multiplexed into the previous data packet. Although the reservation packet is transmitted in a similar manner as described above, the radio parameter for every packet (rather than the radio parameter for only the initial packet) is controlled. Compared to the case where the radio parameter for only the initial data packet is controlled, this method can improve the accuracy of estimating channels. In addition, compared to the method of transmitting a reservation packet according to generation of a data packet, this method can reduce header losses.

Figure 15A:
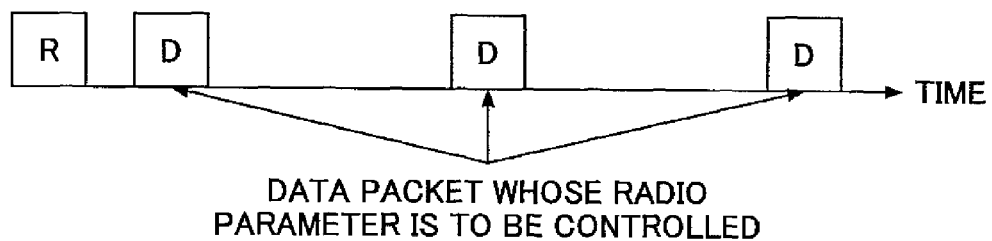
FIG. 15A shows a diagram for illustrating a method of transmitting a reservation packet for reserving periodic slots and controlling a radio parameter for every data packet in a mobile station in accordance with an embodiment of the present invention.
Figure 15B:
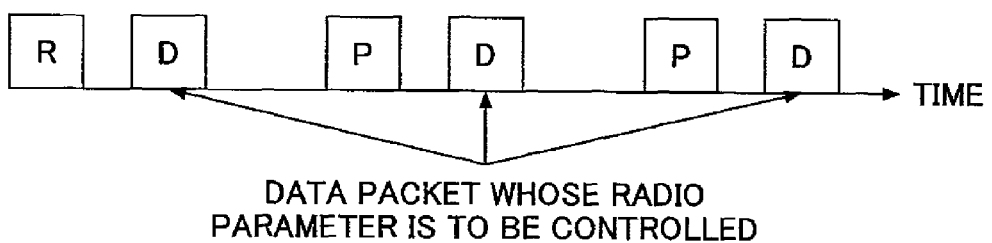
FIG. 15B shows a diagram for illustrating a method of transmitting a reservation packet for reserving periodic slots and transmitting a pilot channel only before each data packet.

In the case where the radio parameter for every data packet is controlled by transmitting a pilot channel before every data packet, a reservation packet is transmitted for the initial data packet and pilot channels are transmitted for the subsequent data packets, as shown in FIG. 15B. Compared to both the method of reserving multiple slots according to the data size and the method of reserving multiple periodic slots, this method can control the radio parameter according to instantaneous channel fluctuations.

With reference to FIGS. 16A, 16B, 17A, and 17B, a description is given below with regard to methods of controlling retransmission of a reservation packet in the mobile station in accordance with the present embodiment.

The mobile station 1 retransmits the reservation packet, if the number of retransmissions of the reservation packet does not reach the maximum number of retransmissions. The mobile station 1 may retransmit the reservation packet until it is detected at the base station 2, or retransmit the reservation packet until its control channel is correctly demodulated at the base station 2. The following description is given in terms of the aforementioned two methods of controlling retransmission from the mobile station.

In the case where the mobile station retransmits the reservation packet until it is detected, the mobile station 1 transmits a data packet when the received SIR of the corresponding reservation packet exceeds the threshold for detecting the reservation packet (i.e. when the base station 2 detects the reservation packet) (detected), as shown in FIG. 16A. The mobile station 1 retransmits the reservation packet when the received SIR is less than or equal to the threshold for detecting the reservation packet (not detected).

Controlling retransmission only using the result of detecting the reservation packet can reduce processing delay including the decoding process. Consequently, the transmission interval between the reservation packet and the data packet can be reduced to the extent of a few milliseconds.

In the case where the mobile station retransmits the reservation packet until the control channel for the reservation packet is correctly demodulated, the mobile station 1 adds CRC (Cyclic Redundancy Check) bits to the reservation packet for error detection and transmits the reservation packet, as shown in FIG. 16B.

As is the case with FIG. 16A, the base station 2 detects the reservation packet and demodulates the control channel. When an error is detected (detected and demodulation failed), the mobile station retransmits the reservation packet. When an error is not detected (detected and modulation succeeded), the mobile station transmits the data packet. In this manner, the control channel for the reservation packet can be transmitted without errors.

With reference to FIGS. 17A and 17B, a description is given below with regard to methods of retransmission-combining reservation packets in the mobile communication system in accordance with the present embodiment.

The base station 2 may perform retransmission-combining of reservation packets, if the number of retransmissions of the reservation packet in the mobile station 1 does not reach the maximum number of retransmissions.

With reference to FIG. 17A, a description is given in terms of demodulating each reservation packet independently without retransmission-combining.

The base station 2 demodulates an initially detected reservation packet and the subsequent reservation packet independently. Therefore, the base station 2 can transmit a downlink channel condition when each reservation packet is transmitted, and the accuracy of following (tracking) channel fluctuations can be improved.

With reference to FIG. 17B, a description is given in terms of performing retransmission-combining of reservation packets.

The base station 2 stores in a receive buffer (not shown) the signal before demodulation, when the reservation packet is detected and a demodulation error occurs (detected and modulation failed). Then, when the base station 2 detects the reservation packet retransmitted from the mobile station 1, the base station 2 decodes the reservation packet after combining the retransmitted reservation packet with the signal before demodulation which is stored in the receive buffer. With this method, a time diversity effect can be achieved. Therefore, both transmission power which satisfies required quality for the reservation packet and delay in the transmission interval between the reservation packets can be reduced.

With reference to FIGS. 18A and 18B, a description is given below with regard to methods of transmitting a reservation packet when a MIMO (Multiple-Input Multiple-Output) transmission is applied to the mobile communication system in accordance with the present embodiment.

The following description is given in terms of a 4*4 MIMO transmission system where the number of transmitting antennas in the mobile station 1 is equal to four and the number of receiving antennas in the base station 2 is equal to four.

In the 4*4 MIMO system, four antennas may be used for transmission, or a single antenna may be used for transmission.

First, with reference to FIG. 18A, a description is given below with regard to the case where four antennas are used for transmission. When four antennas are used to transmit a reservation packet, all of the channel conditions in the 4*4 MIMO system can be accurately measured by means of the reservation packet. Accordingly, a radio parameter for a data packet can be accurately controlled. As used herein, the term "channel" means a path from an antenna m (m: a positive integer) to an antenna n (n: a positive integer). In this case, the mobile station notifies the base station on the uplink in advance that the reservation packet is transmitted under 4*4 MIMO transmission. Alternatively, the base station may provide a grant on the downlink that the mobile station with four antennas can transmit the reservation signal.

Second, with reference to FIG. 18B, a description is given below with regard to the case where a single antenna is used for transmission. In this case, the single antenna is used for a reservation packet, and 4*4 MIMO transmission is used for the subsequent data packet. The reason for using the single antenna for a reservation packet is that the amount of information included in the control channel for the reservation packet is smaller than the amount of information for the subsequent data packet, which eliminates the need for 4*4 MIMO transmission of the reservation packet. In addition, the mobile station need only to notify the base station by means of the reservation packet that 4*4 MIMO transmission is used for the subsequent data packet. It should be noted that correctly estimating an instantaneous channel condition for each channel is difficult based on the estimated channel condition for only one channel measured by means of the reservation packet, because the correlation of instantaneous received SIRs among channels is relatively small.

However, the same transmission power in MIMO transmission is typically used for the transmitting antennas, because fluctuations of instantaneous channel conditions are different among channels transmitted from the same transmitting antenna. Accordingly, the base station can measure the fluctuation of the channel condition on the channel transmitted from the single antenna, and use it as an average value of the estimated channel condition to control a radio parameter.

Although the aforementioned embodiment is described in terms of the 4*4 MIMO transmission system where the number of transmitting antennas in the mobile station is equal to four and the number of receiving antennas in the base station is equal to four, the present invention is applicable to any m*n MIMO transmission system where the number of transmitting antennas in the mobile station is equal to m (m: a positive integer) and the number of receiving antennas in the base station is equal to n (n: a positive integer).

As described above, in wideband radio access in accordance with an embodiment of the present invention, a radio parameter for a data packet is controlled based on a QoS requirement and a downlink channel condition transmitted by means of a reservation packet as well as an uplink channel condition estimated by means of the reservation packet. Thus, communications with minimum transmission power are achieved while satisfying the QoS requirement, and thus link capacity can be improved. According to an embodiment of the present invention, a mobile communication system which minimizes transmission power is achieved while satisfying the QoS requirement.

AVAILABILITY TO INDUSTRY

A mobile communication system of the present invention is applicable to any communication system employing reservation based packet access, which controls a radio parameter for a data packet by means of a reservation packet.

The present application is based on Japanese Priority Application No. 2005-116107 filed on Apr. 13, 2005 and No. 2005-174392 filed on Jun. 14, 2005 with the Japanese Patent Office, the entire contents of which are hereby incorporated by reference.

What is claimed is:

1. A mobile station performing packet communications with a base station in a mobile communication system, comprising:
   a QoS (quality of service) requirement determination unit configured to determine a QoS required for a data packet;
   a downlink channel condition estimation unit configured to estimate a downlink channel condition;
   an identification number extracting unit configured to extract an identification number for the mobile station;
   a control channel generating unit configured to generate a control channel including the QoS determined by the QoS requirement determination unit, the downlink channel condition estimated by the downlink channel condition estimation unit, and the identification number for the mobile station extracted by the identification number extracting unit;
   a reservation packet generating unit configured to generate a reservation packet including the control channel generated by the control channel generating unit to reserve multiple slots for burst-generated traffic according to a data size and to reserve multiple periodic slots for periodically-generated traffic; and
   a transmission unit configured to transmit the reservation packet generated by the reservation packet generating unit.

2. The mobile station as claimed in claim 1, wherein:
the control channel generating unit maps at least
a
transmission power
to the control channel.

3. The mobile station as claimed in claim 1, wherein:
the QoS includes information about a service requirement class corresponding to multiple levels of QoS.

4. The mobile station as claimed in claim 3, further comprising:
a transmission buffer configured to associate data with the service requirement class to store the data, wherein
the transmission unit transmits the data stored in the transmission buffer.

5. The mobile station as claimed in claim 3, wherein:
the QoS requirement determination unit determines an identifier for the service requirement class based on the service requirement class associated with transmission data.

6. The mobile station as claimed in claim 2, wherein:
the transmission unit notifies the base station of the data size based on at least one of a certain fundamental unit and a predetermined threshold.

7. The mobile station as claimed in claim 1, wherein:
the reservation packet generating unit combines the control channel generated by the control channel generating unit and a pilot channel.

8. The mobile station as claimed in claim 1, wherein:
the transmission unit retransmits the reservation packet based on a result of detecting and/or demodulating the reservation packet at the base station.

9. The mobile station as claimed in claim 1, wherein:
the identification number extracting unit requests the identification number for the mobile station using a temporary ID provided for each predetermined domain.

10. The mobile station as claimed in claim 1, wherein:
the identification number extracting unit acquires the identification number in the case where the mobile station is turned on, where connection with the base station is established, or where the mobile station starts communicating.

11. The mobile station as claimed in claim 1, further comprising:
multiple antennas configured to transmit the reservation packet; wherein
the transmission unit notifies the base station of information about an antenna to be used for transmission among the multiple antennas before transmitting the reservation packet.

12. A base station performing packet communications with a mobile station in
a mobile communication system, comprising:
an uplink channel condition estimation unit configured to estimate an uplink channel condition by means of a reservation packet which is to be transmitted by the mobile station to reserve multiple slots for burst-generated traffic according to a data size and to reserve multiple periodic slots for periodically-generated traffic;
a radio parameter control unit configured to reserve the multiple slots and determine and control a radio parameter based on the reservation packet and the uplink channel condition; and
a broadcast unit configured to broadcast the radio parameter controlled by the radio parameter control unit; wherein
the reservation packet includes an identification number for the mobile station, QoS required by the mobile station, and a downlink channel condition estimated by the mobile station.

13. The base station as claimed in claim 12, further comprising:
a demodulation unit configured to combine the reservation packet with another reservation packet received after the reservation packet based on a result of demodulating the reservation packet to perform demodulation.

14. The base station as claimed in claim 12, wherein:
the uplink channel condition estimation unit estimates the uplink channel condition based on information about an antenna received from the mobile station.

15. The base station as claimed in claim 12, further comprising:
a control channel generating unit configured to notify the mobile station of an identification number in response to a request for the identification number received from the mobile station.

16. The base station as claimed in claim 15, wherein:
the control channel generating unit manages the identification number based on at least one of a sector domain and a base station domain.

17. A mobile communication system where packet communications are performed between a base station and a mobile station, wherein:
the mobile station comprises
a QoS (quality of service) requirement determination unit configured to determine QoS required for a data packet;
a downlink channel condition estimation unit configured to estimate a downlink channel condition;
an identification number extracting unit configured to extract an identification number for the mobile station;
a control channel generating unit configured to generate a control channel including the QoS determined by the QoS requirement determination unit, the downlink channel condition estimated by the downlink channel condition estimation unit, and the identification number for the mobile station extracted by the identification number extracting unit;
a reservation packet generating unit configured to generate a reservation packet including the control channel generated by the control channel generating unit to reserve multiple slots for burst-generated traffic according to a data size and to reserve multiple periodic slots for periodically-generated traffic; and
a transmission unit configured to transmit the reservation packet generated by the reservation packet generating unit; and
the base station comprises
an uplink channel condition estimation unit configured to estimate an uplink channel condition by means of the reservation packet;
a radio parameter control unit configured to reserve the multiple slots and control a radio parameter based on the reservation packet and the uplink channel condition; and
a broadcast unit configured to broadcast the radio parameter controlled by the radio parameter control unit.

18. A communication control method in a mobile communication system where packet communications are performed between a base station and a mobile station, comprising the steps of:
at the mobile station,
determining a QoS (quality of service) required for a data packet;

estimating a downlink channel condition;
extracting an identification number for the mobile station;
generating a control channel including the determined QoS, the estimated downlink channel condition, and the extracted identification number for the mobile station;
generating a reservation packet including the generated control channel to reserve multiple slots for burst-generated traffic according to a data size and to reserve multiple periodic slots for periodically-generated traffic; and
transmitting the generated reservation packet;
at the base station,
estimating an uplink channel condition by means of the reservation packet;
reserving the multiple slots and determining and controlling a radio parameter based on the reservation packet and the uplink channel condition; and
broadcasting the controlled radio parameter.

19. The communication control method as claimed in claim 18, wherein
the step of generating the control channel comprises the step of:
mapping at least a transmission power to the control channel.

20. The communication control method as claimed in claim 18, further comprising the steps of:
at the mobile station,
requesting the identification number using a temporary ID provided for each domain in which the identification number is managed; and
at the base station,
notifying the mobile station of the identification number in response to the request for the identification number received from the mobile station.

* * * * *